United States Patent
Huang et al.

(10) Patent No.: US 11,735,770 B2
(45) Date of Patent: *Aug. 22, 2023

(54) POLYMER SOLID ELECTROLYTES, METHODS OF MAKING, AND ELECTROCHEMICAL CELLS COMPRISING THE SAME

(71) Applicant: Factorial Inc., Woburn, MA (US)

(72) Inventors: Peishen Huang, Woburn, MA (US); Guopeng Fu, Woburn, MA (US); Jia Du, Woburn, MA (US); Dong Ren, Woburn, MA (US)

(73) Assignee: Factorial Inc., Woburn, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/717,177

(22) Filed: Apr. 11, 2022

(65) Prior Publication Data

US 2022/0302499 A1    Sep. 22, 2022

Related U.S. Application Data

(63) Continuation of application No. 16/554,541, filed on Aug. 28, 2019, now Pat. No. 11,302,960, which is a
(Continued)

(51) Int. Cl.
*H01M 10/0565* (2010.01)
*C08F 22/22* (2006.01)
(Continued)

(52) U.S. Cl.
CPC ......... *H01M 10/0565* (2013.01); *C08F 22/22* (2013.01); *C08G 59/28* (2013.01);
(Continued)

(58) Field of Classification Search
CPC ......... H01M 10/0565; H01M 10/0525; H01M 2300/0082; C08F 22/22; C08F 2810/20;
(Continued)

(56) References Cited

U.S. PATENT DOCUMENTS 5,691,080 A * 11/1997 Derzon ............. H01M 10/0566
429/303
6,562,513 B1    5/2003 Takeuchi et al.
(Continued)

FOREIGN PATENT DOCUMENTS

JP        3575108 B2    10/2004
JP        2005263988 A   9/2005

OTHER PUBLICATIONS

Alvarado et al., A carbonate-free, sulfone-based electrolyte for high-voltage Li-ion batteries. Mat. Today. May 2018:21(4);341-53.
(Continued)

Primary Examiner — Michael M. Bernshteyn

(57) ABSTRACT

The present invention generally relates to various polymer solid electrolyte materials suitable for various electrochemical devices and methods for making or using the same. Certain embodiments of the invention are generally directed to solid electrolytes having relatively high ionic conductivity and/or other mechanical or electrical properties, e.g., tensile strength or decomposition potential. Certain aspects include a polymer, a plasticizer, and an electrolyte salt. In some cases, the polymer may exhibit certain structures such as:

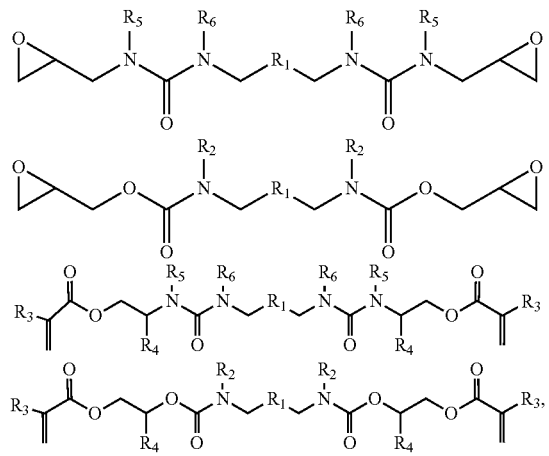

where $R_1$ can be one of the following groups:

(Continued)

-continued

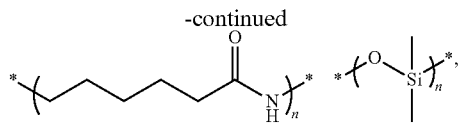

where n is an integer between 1 and 10000, m is a integer between 1 and 5000, and $R_2$ to $R_6$ are each independently selected from the group consisting of hydrogen, methyl, ethyl, phenyl, benzyl, acryl, epoxy ethyl, isocyanate, cyclic carbonate, lactone, lactam, and vinyl; and * indicates a point of attachment.

20 Claims, 4 Drawing Sheets

Related U.S. Application Data continuation-in-part of application No. 16/240,502, filed on Jan. 4, 2019, now Pat. No. 11,335,950.

(60) Provisional application No. 62/757,133, filed on Nov. 7, 2018.

(51) Int. Cl.
*C08G 59/28* (2006.01)
*C08J 3/24* (2006.01)
*H01M 10/0525* (2010.01)

(52) U.S. Cl.
CPC ........... *C08J 3/24* (2013.01); *H01M 10/0525* (2013.01); *C08F 2810/20* (2013.01); *C08J 2335/02* (2013.01); *C08J 2363/00* (2013.01); *H01M 2300/0082* (2013.01)

(58) Field of Classification Search
CPC ......... C08G 59/28; C08J 3/24; C08J 2335/02; C08J 2363/00
USPC .......................................................... 521/28
See application file for complete search history.

(56) References Cited

U.S. PATENT DOCUMENTS

| | | | | |
|---|---|---|---|---|
| 6,822,065 | B1* | 11/2004 | Sanchez | H01M 10/0565 526/329.3 |
| 7,078,131 | B2 | 7/2006 | Noh | H01M 10/052 429/300 |
| 10,347,939 | B2* | 7/2019 | Choi | H01M 10/0565 |
| 2003/0059681 | A1* | 3/2003 | Noh | H01M 10/045 29/623.5 |
| 2003/0207179 | A1 | 11/2003 | Uetani et al. | |
| 2016/0336619 | A1* | 11/2016 | Choi | H01M 10/052 |
| 2016/0372743 | A1 | 12/2016 | Cho et al. | |
| 2018/0316051 | A1 | 11/2018 | Lee et al. | |
| 2020/0144665 | A1 | 5/2020 | Huang et al. | |
| 2020/0144667 | A1 | 5/2020 | Huang et al. | |
| 2021/0020978 | A1 | 1/2021 | Du et al. | |
| 2021/0151794 | A9 | 5/2021 | Huang et al. | |
| 2021/0151795 | A9 | 5/2021 | Huang et al. | |

OTHER PUBLICATIONS

Cai et al., Improving High-Voltage Performance of Lithium-Ion Batteries with Sulfolane as an electrolyte Additive. J. Electrochem. Soc. Feb. 4, 2017:164(4);A714-20.
Chawla et al., Recent Advances in Non-Flammable Electrolytes for Safer Lithium-Ion Batteries. Batteries. Feb. 1, 2019:5(19);25 pages.
Haregewoin et al., Electrolyte additives for lithium ion battery electrodes: progress and perspectives Energy Environ. Sci. 2016:9:1955-88.
Vancaeyzeele et al., Lithium-based oligomer ionic liquid for solvent-free conducting materials. Polymer. Apr. 25, 2018;142:337-47.
Xia et al., Sulfolane-Based Electrolyte for High Voltage Li(Ni0.42Mn0.42Co0.16)02 (NMC442)/Graphite Pouch Cells. J. Electrochem. Soc. 2015:162(8):A1424-31.
Zeng et al., Non-flammable electrolytes with high salt-to-solvent ratios for Li-ion and Li-metal batteries. Nat. Energy. Jul. 2, 2018:3;674-81.
Costa et al., Recent advances on separator membranes for lithium-ion battery applications: From porous membranes to solid electrolytes. Energy Storage Materials. 2019.
Osada et al. Ionic-Liquid-Based Polymer Electrolytes for Battery Applications. Angew. Chem. Int. Ed. 2016, 55, 500-513.
Qian et al. Anode-Free Rechargeable Lithium Metal Batteries, Adv. Funct. Mater. 2016, 26, 7094-7102.
Forsyth et al.; Innovative Electrolytes Based on Ionic Liquids and Polymers for Next-Generation Solid-State Batteries; Acc. Chem. Res. 2019, 52, 686-694.
Gupta et al, Electrochemical study of Ionic Liquid based polymer electrolyte with graphene oxide coated LiFePO4 cathode for Li battery. Solid State Ionics 320 (2018) 186-192.
Office action for Chinese patent application No. 201911077322.5 dated Aug. 9, 2022.
Office action for Japanese patent application No. 2019-196513 dated Oct. 11, 2022.
International search report for PCT/US19/12310 dated Mar. 25, 2019.
EP search report for EP application No. 19205029.2 dated Jan. 24, 2020.
Office action for Chinese patent application No. 201911077322.5 dated Feb. 20, 2022.

* cited by examiner

POLYMER SOLID ELECTROLYTES, METHODS OF MAKING, AND ELECTROCHEMICAL CELLS COMPRISING THE SAME

CROSS-REFERENCE TO RELATED APPLICATIONS

This application is a continuation application of U.S. Ser. No. 16/554,541, filed Aug. 28, 2019, now U.S. Pat. No. 11,302,960, which is a continuation-in-part of U.S. Ser. No. 16/240,502, filed Jan. 4, 2019, now U.S. Pat. No. 11,335,950, which claims the benefit of U.S. Ser. No. 62/757,133, filed Nov. 7, 2018, each of which is incorporated herein by reference in its entirety.

FIELD

The present invention generally relates to various polymer solid electrolyte materials suitable for electrochemical devices such as batteries, capacitors, sensors, condensers, electrochromic elements, photoelectric conversion elements, etc.

BACKGROUND

Accompanying the rise of energy densities of lithium-ion batteries (LIBs) and the expansions of scale, finding a solution to the safety concerns of LIBs becomes more important for LIB development. Safety issues existing in LIBs may arise from the use of mixed flammable solvents such as carbonate/ether as solvent systems, which, in the case of overcharging, short-circuiting, over-heating, etc. can lead to serious accidents from LIBs catching on fire, burning or even exploding, etc.

SUMMARY

The present invention generally relates to various polymer solid electrolyte materials. The subject matter of the present invention involves, in some cases, interrelated products, alternative solutions to a particular problem, and/or a plurality of different uses of one or more systems and/or articles.

In one aspect, the present invention is generally directed to an article comprising a polymer comprising a product of a crosslinking reaction including a polymer selected from the group consisting of:

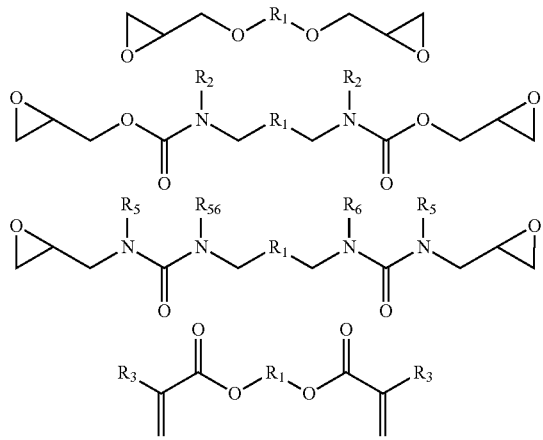

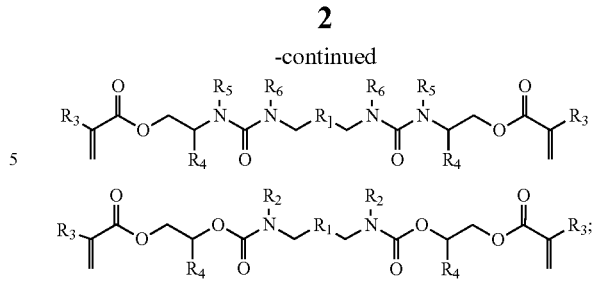

where $R_1$ comprises a structure selected from the group consisting of:

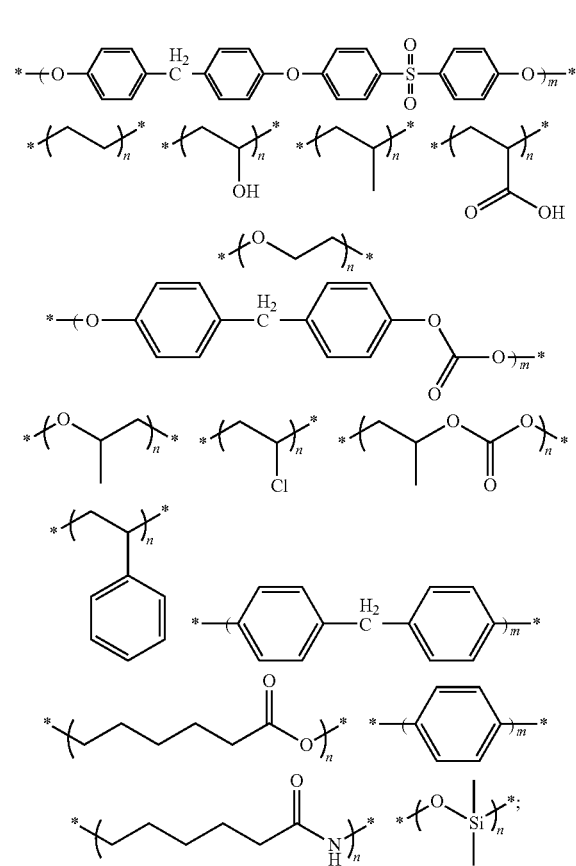

where n is an integer between 1 and 10,000, inclusive; where m is an integer between 1 and 5,000, inclusive; where $R_2$, $R_3$, $R_4$, $R_5$, and $R_6$ are each independently selected from the group consisting of:

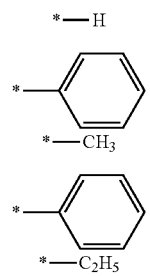

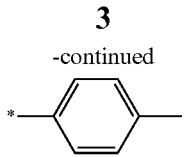

and where * indicates a point of attachment.

In another aspect, the present invention is generally directed to a method of making a polymer solid electrolyte. In one set of embodiments, the method includes mixing a composition comprising a polymer with a solvent to form a slurry, removing the solvent, and curing the slurry to form a solid electrolyte. In some cases, the polymer comprises a structure selected from the group consisting of:

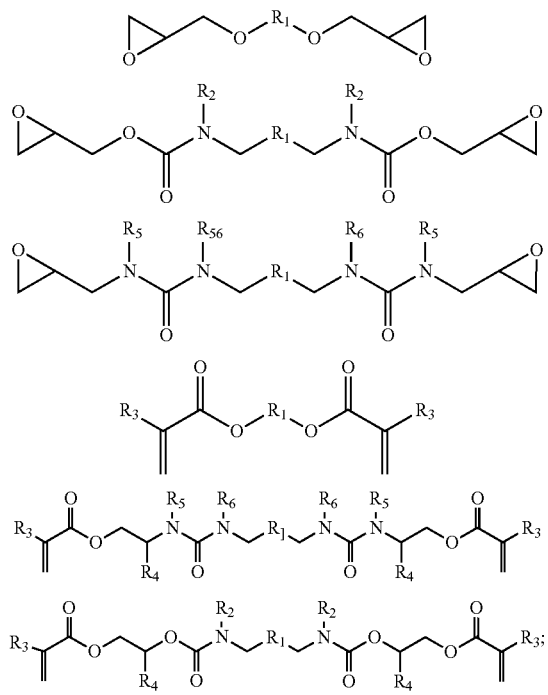

where $R_1$ comprises a structure selected from the group consisting of:

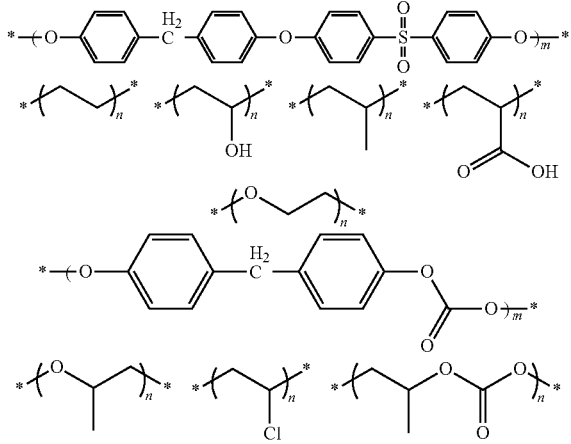

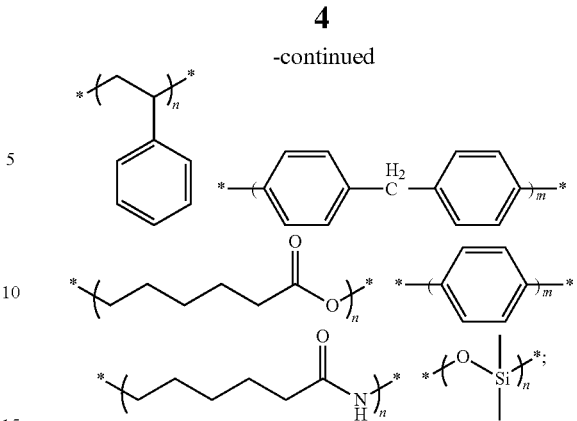

where n is an integer between 1 and 10,000, inclusive; where m is an integer between 1 and 5,000, inclusive; where $R_2$, $R_3$, $R_4$, $R_5$, and $R_6$ are each independently selected from the group consisting of:

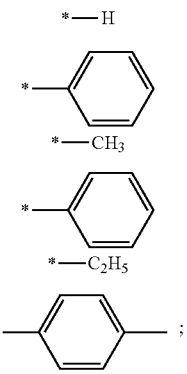

and where * indicates a point of attachment.

In another aspect, the present invention encompasses methods of making one or more of the embodiments described herein, for example, polymer solid electrolyte materials. In still another aspect, the present invention encompasses methods of using one or more of the embodiments described herein, for example, polymer solid electrolyte materials.

Other advantages and novel features of the present invention will become apparent from the following detailed description of various non-limiting embodiments of the invention when considered in conjunction with the accompanying figures.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
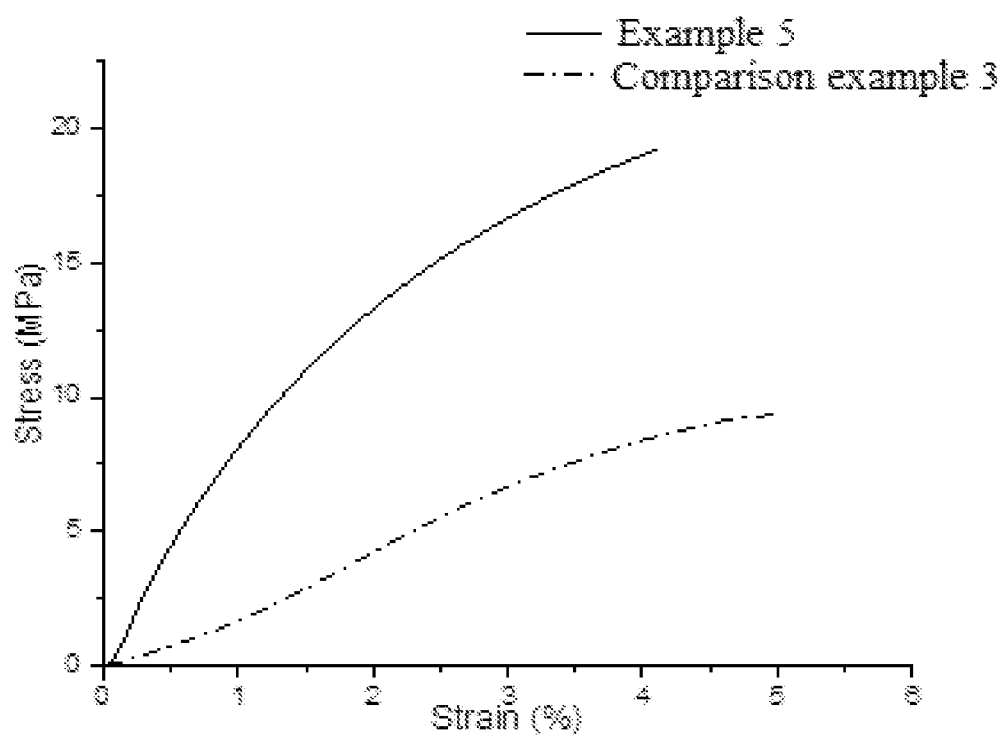
FIG. 1 illustrates mechanical performance test curves of polymer solid electrolyte according to one embodiment of the invention.
Figure 2:
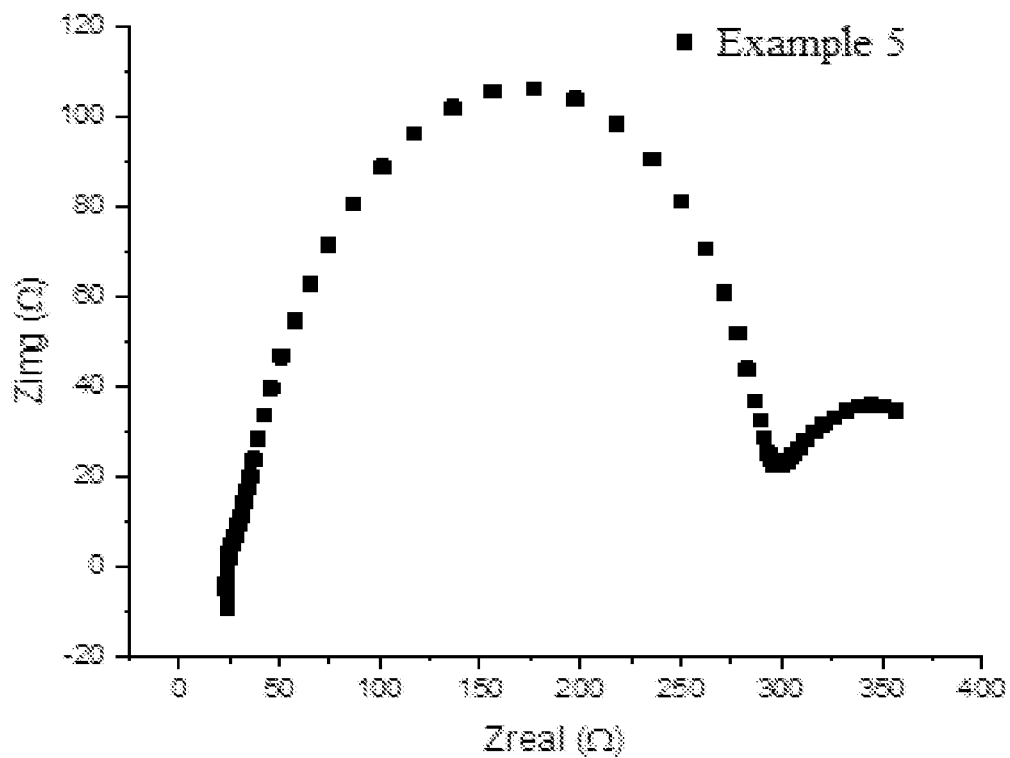
FIG. 2 illustrates an ionic conductivity curve of a polymer solid electrolyte of another embodiment of the invention.

The present invention generally relates to various polymer solid electrolyte materials suitable for various electrochemical devices and methods for making or using the same. Certain embodiments of the invention are generally directed to solid electrolytes having relatively high ionic conductivity and/or other mechanical or electrical properties, e.g., tensile strength or decomposition potential. Certain aspects include a polymer, a plasticizer, and an electrolyte salt. In some cases, the polymer may exhibit certain structures such as:

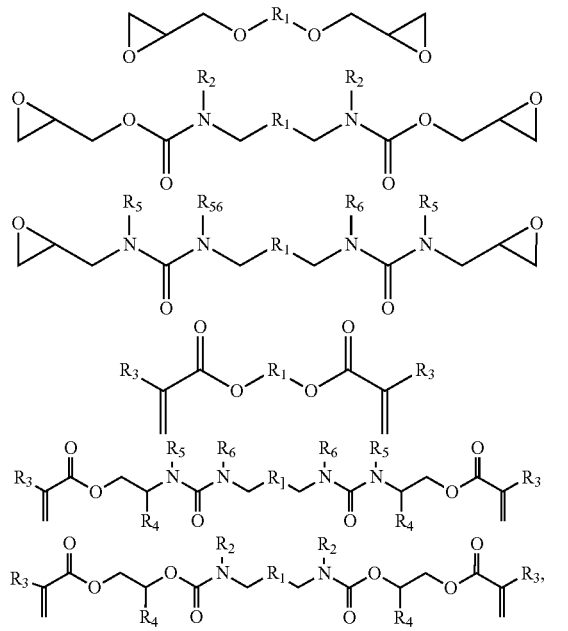

where $R_1$ can be one of the following groups:

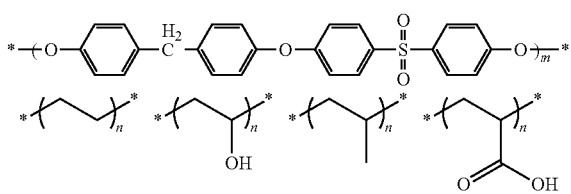

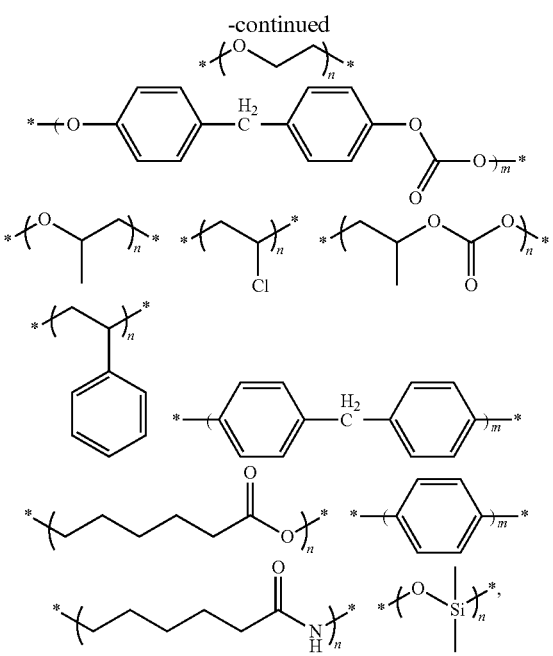

where n is an integer between 1 and 10000, m is a integer between 1 and 5000, and $R_2$ to $R_6$ can each independently be one of the following structures:

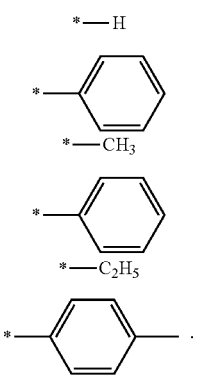

In addition, certain embodiments are directed to compositions for use with polymer solid electrolytes, batteries or other electrochemical devices comprising such polymer solid electrolytes, and methods for producing such polymers. In some cases, the incorporation of urea or carbamate functional groups with UV crosslinking can be used to improve mechanical properties and/or electrochemical performance. In certain embodiments, some polymer solid electrolytes may be used to achieve safer, longer-life lithium batteries. The electrolytes may exhibit better ionic conductivity, and lithium ions may be conducted faster and/or more efficiently. These properties may benefit charging/discharging rate performances. In addition, the improved decomposition potential of the polymer materials may provide enhanced stability in a solid state electrolyte, which may provide for longer-life and/or higher voltage lithium batteries.

Thus, in some aspects, the present invention is generally directed to an electrochemical cell, such as a battery, comprising a polymer solid electrolyte material such as those discussed herein. In one set of embodiments, the battery is a lithium-ion battery, such as a lithium-ion solid-state battery. The electrochemical cell may also comprise an anode, a cathode, a separator, etc. Many of these are available commercially. The polymer solid electrolyte material may be used as the electrolyte of the electrochemical cell, alone and/or in combination with other electrolyte materials.

One aspect, for instance, is generally directed to solid electrolytes comprising certain polymers that can be used within electrochemical devices, for example, batteries such as lithium-ion batteries. Such electrochemical devices will typically include one or more cells, comprising an anode and a cathode, separated by an electrolyte In comparison to liquid electrolytes, solid polymer electrolytes may be lightweight and provide good adhesiveness and processing properties. This may result in safer batteries and other electrochemical devices. In some cases, the polymer electrolyte may allow the transport of ions, e.g., without allowing transport of electrons. The polymer electrolyte may comprise a polymer and an electrolyte. The electrolyte may be, for example, a lithium salt, or other salts such as those discussed herein.

Certain embodiments of the invention are generally directed to solid electrolytes having relatively high ionic conductivity and other mechanical or electrical properties, e.g., tensile strength or decomposition potential. In some cases, for example, a polymer may exhibit improved properties due to the addition of functional groups such as urea and/or carbamate moieties within the polymer, e.g., within the backbone structure of the polymer. In some cases, the urea and/or carbamate moieties may be crosslinked together, and/or to other polymers, e.g., as described herein.

Without wishing to be bound by any theory, it is believed that groups such as urea, urethane, or carbamate contain both hydrogen bond donors and acceptors, which may lead to improvements in properties such as mechanical and/or electrochemical properties, e.g., as discussed herein. For instance, urea linkers with rigid bonding may help to improve mechanical strength. In addition, the hydrogen bonds may help to dissociate lithium salts, which may lead to improved ionic conductivity.

In some embodiments, groups such as urea, urethane, or carbamate may be present in the backbone of the polymer, for example, as a linker between a middle polymeric fragment and two acrylic ends. The urea and/or carbamate may be provided within the polymer using different combinations of functional groups, such as amine and carbamate, or alcohol and isocyanate, during formation of the polymer. Such groups may be present next to each other, and/or some of the groups may be separated by spacer groups, e.g., between the urea and/or carbamate, and an acrylate.

Non-limiting examples of polymers containing urea and/or carbamate moieties include the following structures:

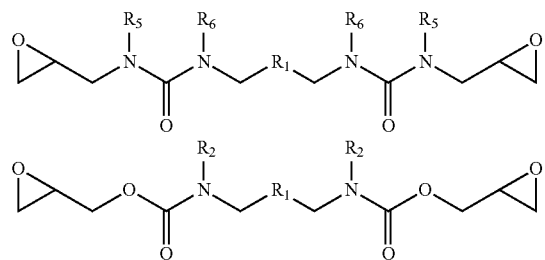

-continued

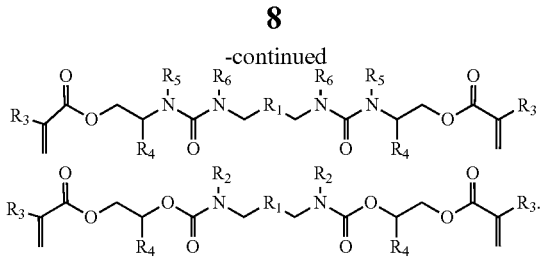

In these structures, $R_1$ may be selected to allow complexation with salts or ions, e.g., to produce a polymer/salt complex that can act as an electrolyte. For example, $R_1$ may include charged moieties, and/or moieties that are uncharged but are readily ionizable to produce a charge, e.g., at acidic or alkaline pH's (for instance, at pH's of less than 5, less than 4, less than 3, or less than 2, or greater than 9, greater than 10, greater than 11, or greater than 12). Specific examples of $R_1$ include, but are not limited to, the following (where * indicates a point of attachment):

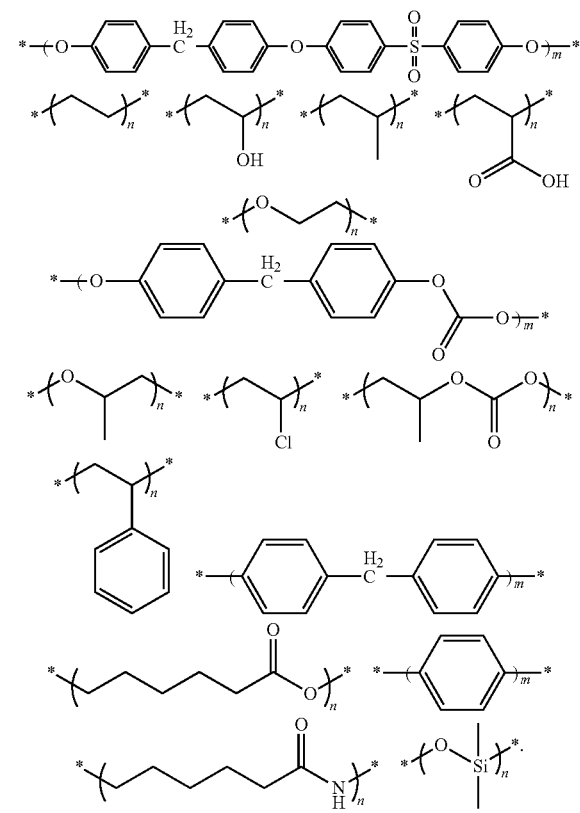

In addition, in some cases, 2, 3, 4, or more of the following may be present simultaneously within the $R_1$ structure, e.g., as copolymers. For example, they may be present in alternating, block, random or other copolymer structures to define the $R_1$ moiety. In some cases, 2, 3, 4, or more polymers may be present, and in some cases may be crosslinked together, e.g., as discussed herein.

In these structures n and/or m (as applicable) may each be an integer. In some cases, n and/or m may each be less than 100,000, less than 50,000, less than 30,000, less than 10,000, less than 5,000, less than 3,000, less than 1,000, less than 500, etc. In certain cases, n and/or m may be at least 1, at least 3, at least 5, at least 10, at least 30, at least 50, at least 100, at least 300, at least 500, at least 1,000, at least 3,000, at least 5,000, at least 10,000, at least 30,000, at least 50,000 etc. Combinations of any of these ranges are possible; as non-limiting examples, n may be an integer between 1 and 10000, m may be an integer between 1 and 5000, n may be an integer between 1000 and 5000, m may be an integer between 500 and 1000, etc.

In these structures $R_2$, $R_3$, $R_4$, $R_5$, and $R_6$ may each be independently chosen (as applicable) to make the polymers symmetric or non-symmetric. Examples of $R_2$, $R_3$, $R_4$, $R_5$, and $R_6$ include, but are not limited to, one of the following structures:

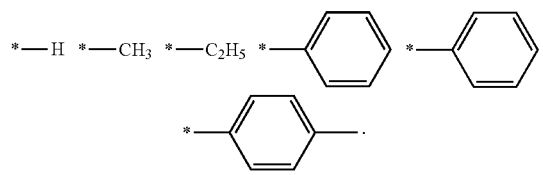

Other examples of $R_2$, $R_3$, $R_4$, $R_5$, and $R_6$ include, but are not limited to, an acrylate, an ethylene oxide, an epoxy ethyl group, an isocyanates, a cyclic carbonate, a lactone, a lactams, a vinyl group ($CH_2$=CH—), or a vinyl derivative (i.e., where 1, 2, or 3 of the H's in the $CH_2$=CH— structure have been replaced by an F or a Cl). Non-limiting examples of cyclic carbonates include ethylene carbonate, propylene carbonate, fluoroethylene carbonate, etc. In addition, it should be understood that these endgroups are provided by way of example only. In general, the endgroups are not critical, as they typically would not affect performance in a significant way.

In addition, in one set of embodiments, functional groups such as urea and/or carbamate may be crosslinked together, e.g., as described herein. For example, such functional groups may be crosslinked together using UV light, thermoforming or exposure to elevated temperatures (e.g., between temperatures of 20° C. and 100° C.), or other methods including those described herein. In some cases, the incorporation of urea or carbamate functional groups can improve mechanical properties, electrochemical performances, or the like, such as relatively high ionic conductivities, ion transference numbers, decomposition voltages, tensile strength, or the like.

In some cases, the degree of crosslinking may be determined. The degree of crosslinking is generally defined by the ratio between the reacted acrylate groups and the original acrylate groups. The weight or molar percentage of the polymer in the formulation can be assumed to control the degree of crosslinking, assuming that all of the acrylate groups have been reacted. In some cases, at least 1%, at least 3%, or at least 5% of the polymer has been crosslinked.

In some cases, solid electrolytes such as those described herein may provide certain beneficial properties, such as surprisingly high ionic conductivities, compared to other solid electrolytes. For example, the polymer solid electrolyte may exhibit ionic conductivities of at least $10^{-8}$ S/cm, at least $2\times10^{-8}$ S/cm, at least $3\times10^{-8}$ S/cm, at least $5\times10^{-8}$ S/cm, at least $10^{-7}$ S/cm, at least $2\times10^{-7}$ S/cm, at least $3\times10^{-7}$ S/cm, at least $5\times10^{-7}$ S/cm, at least $10^{-6}$ S/cm, at least $2\times10^{-6}$ S/cm, at least $3\times10^{-6}$ S/cm, at least $5\times10^{-6}$ S/cm, at least $10^{-5}$ S/cm, at least $2\times10^{-5}$ S/cm, at least $3\times10^{-5}$ S/cm, at least $5\times10^{-5}$ S/cm, at least $10^{-4}$ S/cm, at least $2\times10^4$ S/cm, at least $3\times10^4$ S/cm, at least $5\times10^4$ S/cm, at least $10^{-3}$ S/cm, at least $2\times10^{-3}$ S/cm, at least $3\times10^{-3}$ S/cm, at least $5\times10^{-3}$ S/cm, etc. In one embodiment, for example, the polymer solid electrolyte has ionic conductivity in between $2.1\times10^{-6}$ S/cm and $5.2\times10^{-6}$ S/cm. In other embodiments, as examples, the ionic conductivity may be between $10^{-8}$ and $10^{-2}$ S/cm, or between $5\times10^{-5}$ and $10^{-2}$ S/cm, etc. Without wishing to be bound by any theory, it is believed that ionic conductivity is improved because groups such as ureas or carbamates contain both hydrogen-bond donors and acceptors, which may lead to the improvements of both mechanical and electrochemical performances due to hydrogen boding. In addition, it is believed that the hydrogen bonds may help to dissociate salts such as the lithium for better ionic conductivity.

In addition, in some embodiments, polymer solid electrolytes such as those described herein may provide relatively high decomposition voltages. Polymer solid electrolytes with relatively high decomposition voltages may be particularly useful, for example, in applications where higher voltages are required. In certain cases, the decomposition voltage of the polymer solid electrolyte may be at least 0.3 V, at least 0.4 V, at least 0.5 V, at least 0.6 V, at least 0.7 V, at least 0.8 V, at least 0.9 V, at least 1 V, at least 1.5 V, at least 2 V, at least 2.5 V, at least 3 V, at least 3.5 V, at least 3.8 V, at least 4 V, at least 4.3 V, at least 4.5 V, or at least 5 V. Decomposition voltages can be tested using standard techniques known to those of ordinary skill in the art, such as cyclic voltammetry. Without wishing to be bound by any theory, it is believed that ureas or carbamates contains rigid sigma bonds between carbon and oxygen or nitrogen. The carbon atom in the structure is in the highest covalent state with the carbon-oxygen double bonds, which may help the structure to resist decomposition.

In certain embodiments, polymer solid electrolytes such as those described herein can provide relatively high ion transference numbers. Generally, such transference numbers measure the fraction of electrical current that is carried by certain ionic species, e.g., lithium ions. In some cases, relatively higher ion transference numbers can help with delaying and/or slowing the growth of lithium dendrites, e.g., within lithium batteries. Thus, in some embodiments, polymer solid electrolytes such as those described herein may provide lithium transference numbers of at least 0.1, at least 0.15, at least 0.2, at least 0.25 at least 0.3, at least 0.35, at least 0.4, at least 0.45, at least 0.5, at least 0.55, at least 0.6, at least 0.65, at least 0.7, at least 0.75, at least 0.8, at least 0.85, at least 0.9, at least 0.95, etc. In some cases, the lithium transference numbers may be less than 1, less than 0.95, less than 0.9, less than 0.85, less than 0.8, less than 0.75, less than 0.7, less than 0.65, less than 0.6, less than 0.55, or less than 0.5. Combinations of any of these are also possible in certain embodiments. For example, the lithium transference number may be between 0.4 and 0.65, between 0.45 and 0.6, between 0.3 and 0.7, between 0.42 and 0.64, between 0.1 and 1, or the like. Ion transference numbers can be determined using methods such as the Bruce and Vincent method (*J. Electroanal. Chem. Interfacial Electrochem.*, 255:1-17, 1987), or other techniques known to those of ordinary skill in the art.

In one set of embodiments, polymer solid electrolytes such as those described herein may exhibit relatively high tensile strengths. For example, the tensile strength of the polymer solid electrolytes may be at least 8 MPa, at least 10 MPa, at least 12 MPa, at least 15 MPa, at least 20 MPa, at least 25 MPa, at least 30 MPa, at least 35 MPa, at least 40 MPa, at least 45 MPa, at least 50 MPa, etc. In some cases, the tensile strength of the polymer solid electrolytes may be no more than 50 MPa, no more than 40 MPa, no more than 30 MPa, etc. In certain embodiments, a polymer solid electrolyte may exhibit tensile strengths within any of the ranges, e.g., between 8 MPa and 40 MPa, between 30 MPa and 50 MPa, between 20 MPa and 40 MPa, between 8.2 MPa and 38.4 MPa, between 5 and 500 MPa, between 10 and 500 MPa, etc. Tensile strength can be tested using standard techniques known to those of ordinary skill in the art, such as dynamic mechanical analysis.

In one set of embodiments, the polymer solid electrolyte may include a plasticizer, which may be useful for improve processability of the polymer solid electrolyte, and/or controlling the ionic conductivity and mechanical strength. For example the plasticizer may be a polymer, a small molecule (i.e., having a molecular weight of less than 1 kDa), a nitrile, an oligoether (e.g., triglyme), cyclic carbonate, ionic liquids, or the like. Non-limiting examples of potentially suitable plasticizers include ethylene carbonate, succinonitrile, sulfolane, phosphate, or the like. Non-limiting examples of nitriles include succinonitrile, glutaronitrile, hexonitrile, and/or malononitrile. Non-limiting examples of cyclic carbonate include ethylene carbonate, propylene carbonate, fluoroethylene carbonate, etc. Non-limiting examples of ionic liquids include N-propyl-N-methylpyrrolidinium bis(fluorosulfonyl)imide or 1-ethyl-3-methylimidazolium bis(fluorosulfonyl)imide. Other non-limiting examples of plasticizers include polymers such as polyethylene oxide, a polycarbonate, a polyacrylonitrile, a polylactic acid, or the like. In some cases, the plasticizer may be a polymer that is relatively hydrophilic, e.g., having a water contact angle of less than 90°. In addition, the polymer may be free of sulfur.

In some embodiments, an electrolyte salt may be present. These may include alkali metal salts, such as lithium or sodium. Specific non-limiting examples of lithium salts include LiTFSI, LiFSI, LiBOB, $LiPF_6$, $LiBF_4$, $LiClO_4$, $LiAsF_6$, $LiN(CF_3SO_2)_2$, $LiC(CF_3SO_2)_3$, LiDFOB, LiF, LiCl, LiBr, LiI, $Li_2SO_4$, $LiNO_3$, $Li_3PO_4$, $Li_2CO_3$, LiOH, lithium acetate, lithium trifluoromethyl acetate, lithium oxalate, etc. Other examples include, but are not limited to, quaternary ammonium salts, quaternary phosphonium salt, transition metal salts, or salts of protonic acids. Non-limiting examples of protonic acids include dimethyldioctadecylammonium chloride, tetraphenylphosphonium chloride, cobalt sulfate, lithium sulfate, etc.

In addition, other compounds may also be present, such as cathode protective agents, anode protective agents, anti-oxidative agents, inorganic additive, etc. Non-limiting examples of inorganic additives include $Al_2O_3$, $SiO_2$, $SiO_x$, $TiO_2$, $Li_3PS_4$, $Li_{10}GeP_2S_{12}$, $Li_7La_3Zr_2O_{12}$, $Li_{6.4}La_3Zr_{1.4}Ta_{0.6}O_{12}$, $LiLaTiO_3$, $Li_{1.3}Al_{0.3}Ti_{1.7}(PO_4)_3$, $Li_{1.3}Al_{0.3}Ge_{1.7}(PO_4)_3$, $BaTiO_3$, $Li_2TiO_3$, $ZrO_2$ etc. An example of a cathode protective agent is LiDFOB (lithium difluoro(oxalato)borate). An example of an anode protective agent is fluoroethylene carbonate. An example of an anti-oxidative agent is LiBOB (lithium bis(oxalate)borate). Other similar compounds will be known by those of ordinary skill in the art. These may be added for a variety of reasons, e.g., to improve other performance metrics, such as cyclability. In some cases, an inorganic additive may be used that contains generally electronegative atoms such as oxygen, which may attract cations. Thus, for example, ions such as $Li^+$ can be relocated relatively more easily than the anions.

In some cases, the polymer solid electrolyte may exhibit a microphase-separated structure, such as a network-type microphase-separated structure. In some cases, the cross-linked polymer with may precipitate and form polymer-liquid or polymer solid interface. This can be identified using techniques such as scanning electron microscopy using elemental identification.

In certain cases, a polymer, a plasticizer, and an electrolyte salt may each present within the electrolyte material at any suitable concentration. In addition, one or more than one of these may be present, e.g., there may be more than one polymer, and/or more than one plasticizer, and/or more than one electrolyte salt. Other components, such as cathode protective agents, anode protective agents, anti-oxidative agents, inorganic additive, etc. may also be present as well in some cases.

In one set of embodiments, the polymer may be present at a mole fraction of at least 0.01, at least 0.02, at least 0.027, at least 0.03, at least 0.05, at least 0.1, at least 0.11, at least 0.12, at least 0.13, at least 0.15, at least 0.2, at least 0.21, at least 0.22, at least 0.23, at least 0.25, at least 0.3, and/or no more than 0.3, no more than 0.25, no more than 0.32, no more than 0.22, no more than 0.21, no more than 0.2, no more than 0.15, no more than 0.13, no more than 0.12, no more than 0.11, no more than 0.1, no more than 0.05, no more than 0.03, no more than 0.02, no more than 0.01, etc.

In some embodiments, the plasticizer can be present at a mole fraction of at least 0.1, at least 0.11, at least 0.12, at least 0.13, at least 0.15, at least 0.2, at least 0.22, at least 0.23, at least 0.25, at least 0.287, at least 0.3, at least 0.31, at least 0.32, at least 0.33, at least 0.35, at least 0.4, at least 0.5, at least 0.6, at least 0.7, at least 0.8, at least 0.9, at least 0.93, at least 0.95, and/or no more than 0.95, no more than, no more than 0.93, no more than 0.916, no more than 0.9, no more than 0.8, no more than 0.7, no more than 0.6, no more than 0.5, no more than 0.4, no more than 0.35, no more than 0.33, no more than 0.32, no more than 0.31, no more than 0.3, no more than 0.25, no more than 0.32, no more than 0.22, no more than 0.21, no more than 0.2, no more than 0.15, no more than 0.13, no more than 0.12, no more than 0.11, no more than 0.1, etc.

In one set of embodiments, the electrolyte salt may be present at a mole fraction of at least 0.01, at least 0.03, at least 0.05, at least 0.1, at least 0.13, at least 0.15, at least 0.2, at least 0.23, at least 0.25, at least 0.3, at least 0.33, at least 0.35, at least 0.4, at least 0.43, at least 0.45, at least 0.5, at least 0.53, at least 0.55, at least 0.6, at least 0.63, at least 0.65, at least 0.7, and/or no more than 0.7, no more than 0.65, no more than 0.63, no more than 0.617, no more than 0.6, no more than 0.55, no more than 0.53, no more than 0.5, no more than 0.45, no more than 0.43, no more than 0.4, no more than 0.35, no more than 0.33, no more than 0.3, no more than 0.25, no more than 0.23, no more than 0.2, no more than 0.15, no more than 0.13, no more than 0.1, etc.

Combinations of any of one or more of the above ranges and intervals are also possible. For example, the composition may include a polymer (including more than one polymer) having a mole fraction between 0.027 and 0.200, a plasticizer (including more than one plasticizer) having a mole fraction between 0.287 and 0.916, and an electrolyte salt (including more than one electrolyte salt) having a mole fraction between 0.04 and 0.617. Without wishing to be bound by any theory, if the polymer concentration is too high, the solid electrolyte may be relatively soft, which could be harder to handle; however, if the plasticizer concentration is too high, the solid electrolyte may be very tough, easy to break during handling, and/or may not provide good adhesion.

Certain aspects of the present invention are generally directed to systems and methods for producing any of the polymer solid electrolytes discussed herein. For example, in one set of embodiments, a polymer may be produced by reacting various monomers together. Non-limiting examples of monomers include different combinations of the structures described herein, for example, methacrylate monomers with different ester groups, such as norbornyl methacrylate. Other examples of esters include, but are not limited to, methyl methacrylate, ethyl methacrylate, butyl methacrylate, 2-aminoethyl methacrylate hydrochloride, glycidyl methacrylate, 2-(diethylamino)ethyl methacrylate, etc.

In some cases, an initiator may be present, e.g., to facilitate polymerization. For example, the initiator may include a chemical initiator, such as Irgacure initiator, 2,2'-azobis(2-methylpropionitrile), ammonium persulfate, or other initiators known to those of ordinary skill in the art. In some cases, the initiator may be added to have a mole fraction between 0.001 and 0.01, or other suitable mole fractions to facilitate polymerization.

In one set of embodiments, the polymer may be mixed with a solvent to form a slurry, which can be cured to form a solid. In addition, in some cases, more than one polymer may be present in the slurry, e.g., a first polymer and a second polymer, which may be added to the slurry sequentially, simultaneously, etc. The polymers may each independently be polymers such as those described herein, and/or other suitable polymers.

Non-limiting examples of suitable solvents include solvents such as water (e.g., distilled water), methanol, ethanol, or other aqueous solvents. Other examples of solvents include organic solvents such as pyridine, chloroform, or the like. In some cases, more than one such solvent may be present. In addition, after formation of the slurry, the solvent may be removed, e.g., via techniques such as evaporation.

In addition, in some cases, a plasticizer may be present as well, e.g., such as succinonitrile, ethylene carbonate, sulfolane, trimethyl phosphate, or the like. In addition, in some embodiments, an electrolytic salt may also be present, for example, an alkali metal salt, such as lithium or sodium. Specific non-limiting examples of lithium salts include LiTFSI, LiFSI, LiBOB, LiPF$_6$, LiBF$_4$, LiClO$_4$, LiAsF$_6$, LiN(CF$_3$SO$_2$)$_2$, LiC(CF$_3$SO$_2$)$_3$, LiDFOB, LiF, LiCl, LiBr, LiI, Li$_2$SO$_4$, LiNO$_3$, Li$_3$PO$_4$, Li$_2$CO$_3$, LiOH, lithium acetate, lithium trifluoromethyl acetate, lithium oxalate, etc., or other salts such as those described herein.

In some embodiments, the slurry may be cured to form a film, such as a solid-state film. For instance, the mixture can be formed into a film by curing, for example, using UV light, thermoforming, exposure to elevated temperatures, or the like. For example, curing may be induced using exposure to UV light for at least 3 min, at least 5 min, at least 10 min, at least 15 min, etc., and/or by exposure to temperatures of at least 20° C., at least 30° C., at least 40° C., at least 50° C., at least 60° C., at least 70° C., at least 80° C., at least 90° C., at least 100° C., etc. As an example, a slurry may be coated or positioned on a surface and/or within a mold, and exposed to UV light to cause the polymer to cure.

In addition, in some cases, during the curing process, at least some of the polymers may also cross-link, e.g., as discussed herein, which in some cases may improve mechanical properties and/or electrochemical performance. For example, exposure to UV light may facilitate the cross-linking process. As another example, thermal crosslinking may be used.

U.S. Provisional Patent Application Ser. No. 62/757,133, filed Nov. 7, 2018, entitled "Polymer Solid Electrolytes," by Huang, et al., is incorporated herein by reference in its entirety. Also incorporated herein by reference in their entireties are U.S. patent application Ser. No. 16/240,502, filed Jan. 4, 2019, entitled "Polymer Solid Electrolytes," by Huang, et al., and International Patent Application Serial No. PCT/US19/12310, filed Jan. 4, 2019, entitled "Polymer Solid Electrolytes," by Huang, et al.

The following examples are intended to illustrate certain embodiments of the present invention, but do not exemplify the full scope of the invention.

Example 1

This example illustrates the synthesis of a PEG-urethane-diepoxy polymer having a general structure:

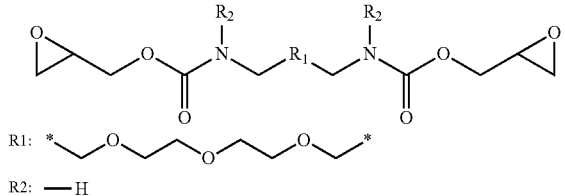

In this example, 40 mmol of 4,7,10-trioxa-1,13-tridecanediamine (TTDDA; commonly known as polyethylene glycol diamine (PEGDAm)), 200 mmol pyridine and 100 ml CHCl$_3$ were added to a 250 mL round-bottom flask. These are all generally available commercially; in particular, PEGDAm can be obtained in a range of molecular weights, corresponding to the number of repeat units of polyethylene glycol within the compound. See also FIG. 5.

The mixture was stirred at 0° C. for 5 h, and then a slightly yellow solution was obtained. 100 ml of 0.1 mol/l hydrochloric acid was poured onto the reaction mixture, and the product was collected and washed with 200 ml CHCl$_3$ twice. After drying with MgSO$_4$, the crude product was evaporated to become a light brown crude diisocyanate. The product (PEG-diisocyanate or PEGDI) was purified by a silica gel column.

10 mmol PEG-diisocyanate (PEGDI) and (25 mmol) glycidol were reacted at 0° C. for 24 h with a 0.1% dibutyltin dilaurate catalyst. The product was washed with 0.5 M sodium bicarbonate solution. The organic phase was dried with MgSO$_4$. After the solvent was evaporated, a light brown crude diisocyanate was obtained. By applying CHCl$_3$-hexane at a volume ratio of 1:4 to 3:2 as an eluent, column chromatography was used to purify the product to produce the polymer (PEG-urethane-diepoxy or PEGDEp).

A solid-state polymer electrolyte was obtained by mixing the as-synthesized polymer, lithium salts (lithium bis(trifluoromethanesulfonyl)imide, LiTFSI), and plasticizer (succinonitrile, SN) in the ratios described in Table 1 by mechanical stirring at room temperature in the liquid state.

The above mixture was applied to a PET thin film. In particular, a solid-state polymer electrolyte film was obtained by UV-curing for 5 min. Mechanical properties, ionic conductivities, and electrochemical stabilities of the membrane were determined on the as-processed film, as follows.

Mechanical property testing was performed with dynamic mechanical analysis using a Dynamic Mechanical Analyzer (DMA Q800, TA Instruments). The polymer solid-state membrane was molded into a standard tensile test sample with dimensions of 7 mm×58 mm. The elongation speed was 3 mm/min.

Electrochemical stability testing was performed using cyclic voltammetry measurements with an AC impedance analyzer (Interface 1010E Potentiostate, Gamry). Samples with an area of 1 cm² were sealed between stainless-steel plate and lithium foil (reference electrode). The operating voltage range was from −0.5 to 5.6 V with a scan rate of 10 mV/s. The experiment was conducted at room temperature.

Ionic conductivities testing was performed with an AC impedance analyzer (Interface 1010E Potentiostat, Gamry). Samples with an effective area of 1 cm² were placed in 2032 coin-type cells. The ionic conductivity was measured in the frequency range of 13 MHz to 5 Hz by a bias voltage of 10 mV.

Example 2

This example illustrates the synthesis of a PEG-urea-diepoxy polymer having a general structure:

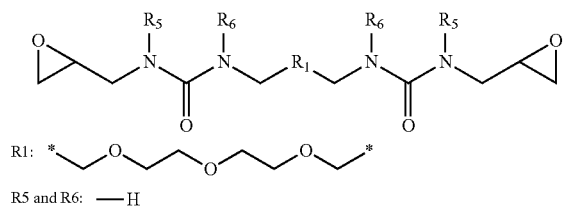

In this example, 40 mmol of 4,7,10-trioxa-1,13-tridecanediamine (TTDDA; commonly known as polyethylene glycol diamine (PEGDAm)), 200 mmol pyridine and 100 ml CHCl₃ were added to a 250 mL round-bottom flask. The mixture was stirred at −10° C. for 10 min, and then 80 ml triphosgene 85 mmol in CHCl₃ solution was added to the solution for 10 min at −20° C. The mixture was then stirred at 0° C. for 5 h. A slightly yellow solution was obtained.

100 ml of 0.1 mol/L hydrochloric acid was added to the reaction mixture to obtain a two-phase separated liquid mixture. The product was collected and washed with 200 ml CHCl₃ twice. The moisture in the product was removed by adding MgSO₄. After the solvent was evaporated, a light brown crude diisocyanate was obtained. The product (PEG-diisocyanate or PEGDI) was purified by a silica gel column.

Then, 10 mmol PEGDI and 25 mmol glycidyl amine were reacted at 0° C. for 24 h with a 0.1% dibutyltin dilaurate catalyst. The product was washed with 0.5 M sodium bicarbonate solution. The organic phase was dried with MgSO₄. After the solvent was evaporated, a light brown crude diisocyanate was obtained. By applying CHCl₃-hexane at a volume ratio of 1:4 to 3:2 as an eluent, column chromatography was used to purify the product (PEG-urea-diepoxy or PEGDEp).

A solid-state polymer electrolyte was obtained by mixing the as-synthesized polymer, lithium salts (lithium bis(trifluoromethanesulfonyl)imide, LiTFSI), and plasticizer (succinonitrile, SN) in the ratios described in Table 1 by mechanical stirring at room temperature in the liquid state.

The above mixture was applied to a PET thin film. In particular, a solid-state polymer electrolyte film was obtained by UV-curing for 5 min. Mechanical properties, ionic conductivities, and electrochemical stabilities of the membrane were determined on the as-processed film, using measurement methods and conditions similar to Example 1.

Example 3

Figure 3:
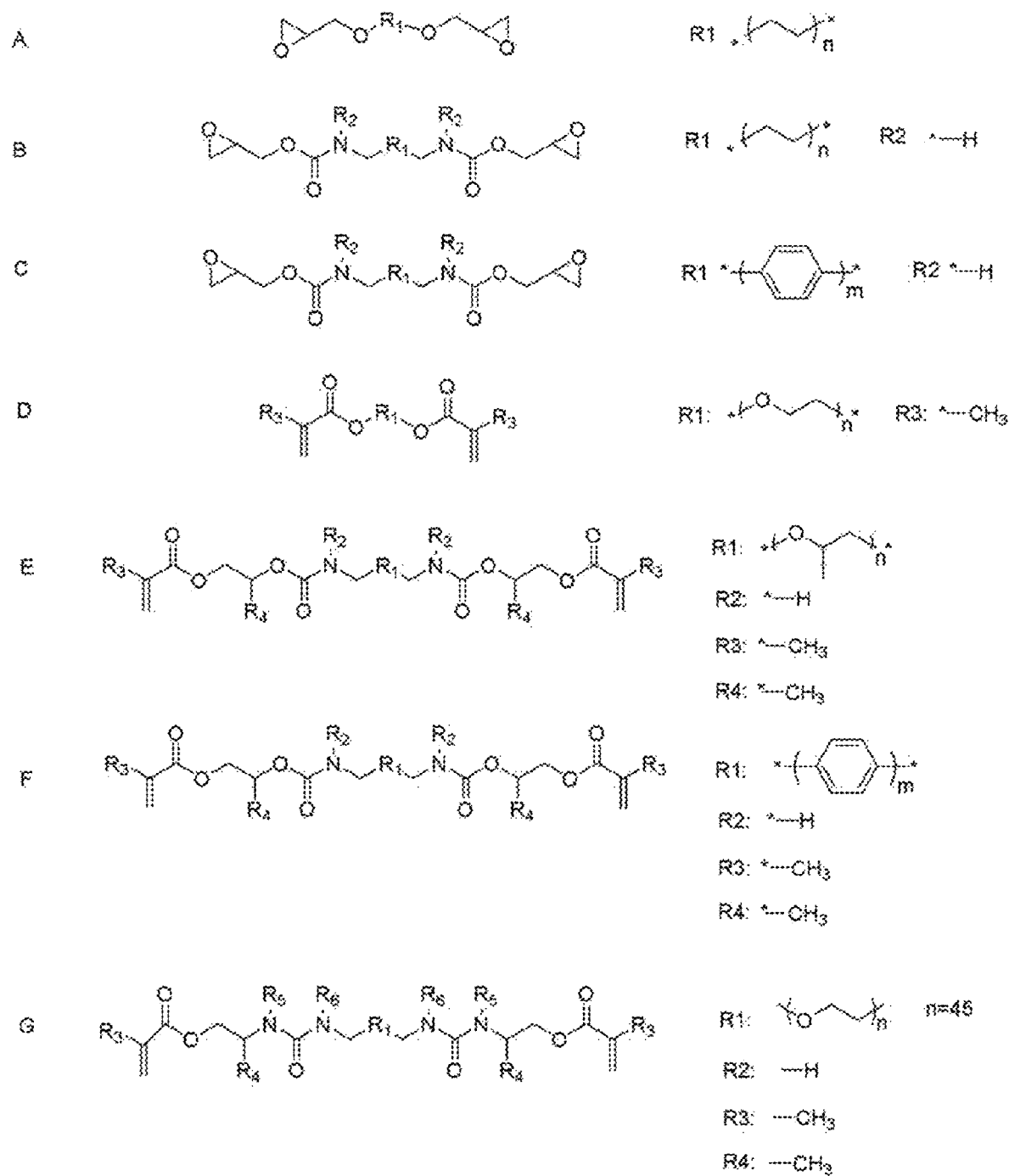
FIG. 3 illustrates certain chemical structures of polymers, in accordance with some embodiments of the invention.

This example illustrates the synthesis of decyl-urethane-diepoxy, Polymer B (see FIG. 3):

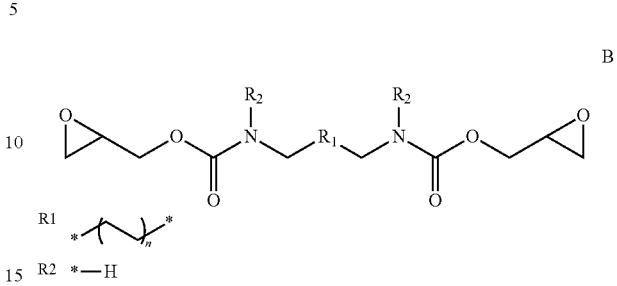

In this structure, n is 5. In this example, 60 mmol of 1,10-diaminodecane, 120 mmol pyridine, and 50 ml CHCl₃ were added to a 100 ml round-bottom flask. The mixture was stirred at −20° C. for 30 min, and then 80 ml triphosgene of 85 mmol in CHCl₃ solution was added to the solution in 10 min at −20° C. The mixture was then stirred at 0° C. for 12 h. A slightly yellow solution was obtained.

100 ml of 0.1 mol/1 hydrochloric acid was added to the reaction mixture to obtain a two-phase separated liquid mixture. The product was collected and washed with 200 ml CHCl₃ twice. The moisture in the product was removed by adding MgSO₄. After the solvent was evaporated, a light brown crude diisocyanate was obtained. The product (decyl diisocyanate or DDI) was purified by a silica gel column.

10 mmol DDI and 25 mmol glycidol were reacted at 0° C. for 24 h with a 0.1% dibutyltin dilaurate catalyst. The product was washed with 0.5 M sodium bicarbonate solution. The organic phase was dried with MgSO₄. After the solvent was evaporated, a light brown crude diisocyanate was obtained. By applying CHCl₃-hexane at a volume ratio of 1:4 to 3:2 as an eluent, column chromatography was used to purify the product (decyl-urethane-diepoxy or DDEp).

A solid-state polymer electrolyte was obtained by mixing the as-synthesized polymer, lithium salts (lithium bis(trifluoromethanesulfonyl)imide, LiTFSI), and plasticizer (ethylene carbonate, EC) in the ratios described in Table 1 by mechanical stirring at room temperature in the liquid state.

The above mixture was applied to a PET thin film. In particular, a solid-state polymer electrolyte film was obtained by UV-curing for 5 min. Mechanical properties, ionic conductivities, and electrochemical stabilities of the membrane were determined on the as-processed film, using measurement methods and conditions similar to Example 1.

Example 4

This example illustrates the synthesis of benzene-urethane-diepoxy, Polymer C (see FIG. 3):

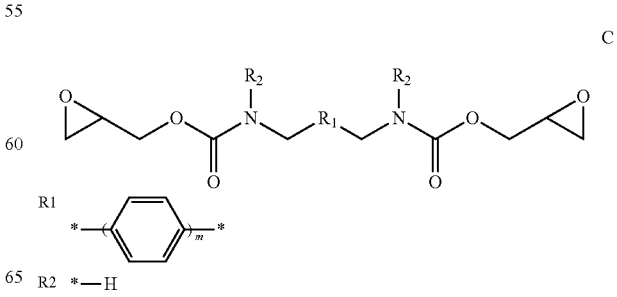

In this structure, m is 1. In this example, 60 mmol of 1,4-diaminobenzene of 120 mmol pyridine and 50 ml $CHCl_3$ were added to a 100 ml round-bottom flask. The mixture was stirred at −20° C. for 30 min, and then 80 ml triphosgene of 85 mmol in $CHCl_3$ solution was added to the solution in 10 min at −20° C. The mixture was then stirred at 0° C. for 12 h. A slightly yellow solution was obtained.

100 ml of 0.1 mol/l hydrochloric acid was added to the reaction mixture to obtain a two-phase separated liquid mixture. The product was collected and washed with 200 ml $CHCl_3$ twice. After drying with $MgSO_4$, a crude product was obtained by solvent evaporation. The product (1,4-benzene diisocyanate or DDI) was purified by a silica gel column.

10 mmol DDI and 25 mmol glycidol were reacted at 0° C. for 24 h with a 0.1% dibutyltin dilaurate catalyst. The product was washed with 100 ml 0.5 M sodium bicarbonate solution. The organic phase was dried with $MgSO_4$. After the solvent was evaporated, a light brown crude diisocyanate was obtained. By applying $CHCl_3$-hexane at a volume ratio of 1:4 to 3:2 as an eluent, column chromatography was used to purify the product (benzene-urethane-diepoxy or DDEp).

A solid-state polymer electrolyte was obtained by mixing the as-synthesized polymer, lithium salts (lithium bis(trifluoromethanesulfonyl)imide, LiTFSI), and plasticizer (succinonitrile, SN) in the ratios described in Table 1 by mechanical stirring at room temperature in the liquid state.

The above mixture was applied to a PET thin film. In particular, a solid-state polymer electrolyte film was obtained by UV-curing for 5 min. Mechanical properties, ionic conductivities, and electrochemical stabilities of the membrane were determined on the as-processed film, using measurement methods and conditions similar to Example 1.

Comparison Examples 1 and 2

The polymer for comparison 1 is:

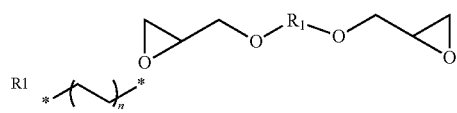

The polymer in comparison 2 is Polymer A (see also FIG. 3):

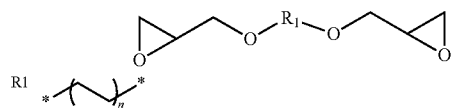

These polymers can be obtained commercially.

A solid-state polymer electrolyte was obtained by mixing the as-synthesized polymer, lithium salts (lithium bis(trifluoromethanesulfonyl)imide, LiTFSI), and plasticizer in the ratios described in Table 1 by mechanical stirring at room temperature in the liquid state. In Comparison Example 1, succinonitrile (SN) was used. In Comparison Example 2, ethylene carbonate (EC) was used.

The above mixture was applied to a PET thin film. In particular, a solid-state polymer electrolyte film was obtained by UV-curing for 5 min. Mechanical properties, ionic conductivities, and electrochemical stabilities of the membrane were determined on the as-processed film, using measurement methods and conditions similar to Example 1.

Example Summary

Table 1 illustrates characterization data of the polymer solid electrolytes shown in Examples 1-4 and Comparison Examples 1 and 2.

TABLE 1

| Example/Comparison | Lithium salt | Plasticizer | Molar ratio of polymer, plasticizer, lithium salt | Tensile strength (MPa) | Ionic Conductivity (S/cm) | Decomposition Voltage (V) |
|---|---|---|---|---|---|---|
| Example 1 | LiTFSI | SN | 1:3:1 | 19.2 | $3.3 \times 10^{-4}$ | 4.3 |
| Example 2 | | SN | | 30.8 | $8.2 \times 10^{-5}$ | 4.4 |
| Example 3 | | EC | | 17.8 | $3.7 \times 10^{-4}$ | >4.6 |
| Example 4 | | EC | | 29.7 | $6.2 \times 10^{-4}$ | >4.6 |
| Comparison Example 1 | | SN | | 8.6 | $4.9 \times 10^{-4}$ | 4.0 |
| Comparison Example 2 | | EC | | 8.6 | $2.8 \times 10^{-4}$ | 4.0 |

In these examples, the different plasticizers were compared (succinonitrile, SN vs. ethylene carbonate, EC), and the different $R^1$ groups were compared (a C—C—O hydrophilic backbone vs. a C—C hydrophobic backbone). Compared to Comparison Examples 1 and 2, by introducing a carbamate group (Examples 1, 3, and 4) or a urea group (Example 2) into the polymer, the tensile strength, ionic conductivity, and degradation voltage of the polymer solid electrolyte all were enhanced.

Example 5

Figure 6:
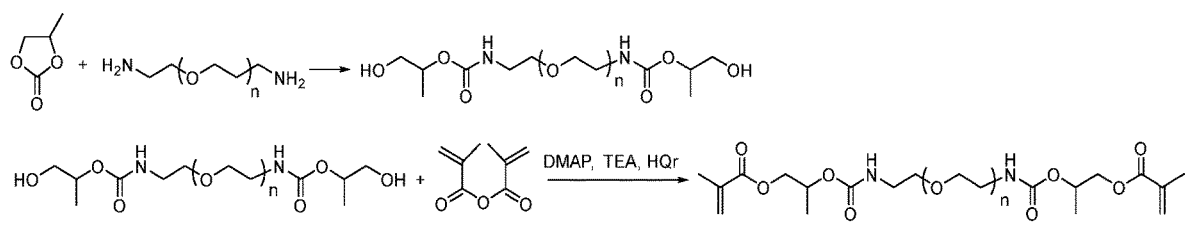
FIG. 6 is a schematic for synthesizing a polymer in accordance with another embodiment of the invention.
Figure 7:
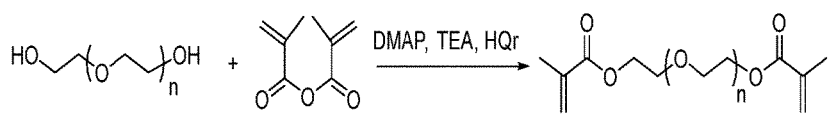
FIG. 7 is a schematic for synthesizing a comparative example.

This example illustrates the synthesis of a polyethylene glycol-bis-carbamate polymer having a general structure. See also FIG. 6:

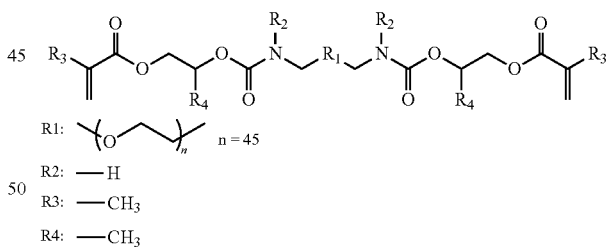

In this example, a round bottom flask was filled with poly(ethylene glycol) diamine (40 mmol, Mn=2000, PEG2000DAm), propylene carbonate (85 mmol), and chloroform (100 ml). The mixture was stirred for 24 hours at 20° C. The resultant reaction mixture solution was washed with water (100 ml). The water fraction was separated and re-extracted by two portions of chloroform (100 ml). All of the organic phases were combined and dried with magnesium sulfate. The dried organic solution was filtered and concentrated using a rotary evaporator. A crude mixture of polyethylene glycol-bis-carbamate (PEGBC2000) was formed as a yellow solid. The crude product was further purified by silica column chromatography.

The PEGBC2000 (10 mmol) obtained from last step was mixed with methacrylic anhydride (25 mmol) in a beaker in an ice-cold bath. 4-dimethylaminopyridine (0.1%, DMAP) was used as a catalyst, with hydroquinone (0.1%, HQr) as an inhibitor, and triethylamine (50 mmol, TEA). The reaction was carried out for 24 hours. The crude reaction mixture was neutralized and washed with 0.5 M aqueous sodium bicarbonate solution. Then, the aqueous phase was washed twice with chloroform. All of the organic phases were combined and dried with magnesium sulfate. The dried organic solution was filtered and concentrated using a rotary evaporator. A crude mixture of polyethylene glycol-bis-carbamate dimethacrylate (PEGBC2000DA) was obtained as a yellow solid.

ion transfer numbers may help with delaying the growth of lithium dendrites. In some cases, palliating polarization during charge and discharge may further reduce the internal electrical resistance.

Figure 5:
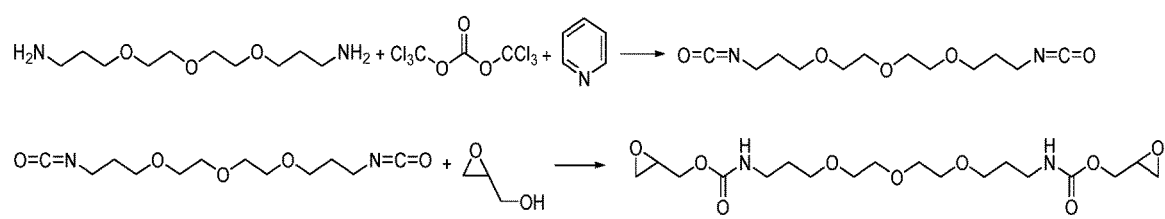
FIG. 5 is a schematic for synthesizing a polymer in accordance with one embodiment of the invention.

FIG. 5 shows electrochemical impedance spectroscopy of solid state electrolytes fabricated by the polymer in Example 5. The formulation is shown in Table 2, Example 5-2. The far left cross between the semi-cycle and the line Y=0 shows the bulk resistance of the solid state electrolyte membrane. The ionic conductivity can be calculated with the known thickness and area the membrane.

TABLE 2

| Example | Lithium Salt | Plasticizer | Molar ratio of polymer: plasticizer: lithium salt | Tensile strength (MPa) | Elongation at break (%) | Ionic Conductivity (S/cm) | Decomposition Voltage (V) |
|---|---|---|---|---|---|---|---|
| Example 5-1 | LiTFSI | SN | 1:1:3 | 19.2 | | $8.60 \times 10^{-4}$ | >4.6 |
| Example 5-2 | LiPF$_6$ | EC | 1:1:3 | 18.3 | | $1.12 \times 10^{-3}$ | >4.6 |
| Example 5-3 | LiPF$_6$ | SN | 1:1:3 | 18.0 | | $9.30 \times 10^{-4}$ | >4.6 |
| Example 5-4 | LiTFSI | SN | 1:1:3 | 19.2 | | $1.28 \times 10^{-3}$ | >4.6 |
| Example 5-5 | LiPF$_6$ | SN | 1:8:1 | 33.9 | | $1.40 \times 10^{-4}$ | >4.6 |
| Example 5-6 | LiTFSI | EC | 8:82:10 | 1.78 | | $8.20 \times 10^{-4}$ | >4.6 |
| Example 5-7 | LiTFSI | EC | 10:68:22 | 2.29 | 10.5 | $1.10 \times 10^{-3}$ | >4.6 |
| Example 5-8 | LiTFSI | EC | 13:49:39 | | | $9.00 \times 10^{-4}$ | >4.6 |
| Example 5-9 | LiTFSI | EC | 14:66:20 | 2.77 | 9.3 | $5.30 \times 10^{-4}$ | >4.6 |
| Example 5-10 | LiTFSI | EC | 13:74:13 | 3.20 | 11.9 | $2.50 \times 10^{-4}$ | >4.6 |
| Example 5-11 | LiTFSI | EC | 16:64:20 | | | $1.52 \times 10^{-4}$ | >4.6 |
| Example 5-12 | LiTFSI | EC | 28:55:17 | 5.2 | | $1.20 \times 10^{-4}$ | >4.6 |
| Example 5-13 | LiTFSI | EC | 23:70:7 | 4.17 | | $1.00 \times 10^{-4}$ | >4.6 |
| Example 5-14 | LiTFSI | EC | 52:37:11 | 7.2 | | $1.10 \times 10^{-4}$ | >4.6 |
| Example 5-15 | LiTFSI | EC | 50:37:13 | | | $9.40 \times 10^{-5}$ | >4.6 |
| Example 5-16 | LiTFSI | EC | 58:21:21 | 6.26 | 3.4 | $7.20 \times 10^{-6}$ | >4.6 |
| Example 5-17 | LiTFSI | EC | 45:50:5 | | | $1.70 \times 10^{-5}$ | >4.6 |
| Example 5-18 | LiTFSI | EC | 70:23:7 | 8.04 | 2.5 | $2.10 \times 10^{-6}$ | >4.6 |

The crude product was further purified by silica column chromatography with an eluent of mixed solvent of chloroform and n-hexane in a volume ratio of between 1:4 and 3:2.

A solid-state polymer electrolyte was obtained by mixing the as-synthesized polymer, lithium salts, and plasticizer in the amounts and ratios described in Table 2 by mechanical stirring at room temperature in the liquid state.

The products obtained via these methods were mixed with polymers, lithium salts, initiators, and inorganic fillers in certain molar ratios. The mixtures were blended into a single-phase liquid by stirring at room temperature. The obtained mixture was solidified into a solid state electrolyte. Details of the lithium salt, plasticizers, and other components are listed in Table 3.

The liquid and viscous mixture mentioned above was directly applied onto a polyethylene terephthalate (PET) substrate. A 5-minute UV exposure was applied to the coating. Mechanical properties (e.g., tensile strength and tensile elongation), ionic conductivities, and electrochemical stabilities were determined. The measurement methods and conditions are similar to Example 1. Results are listed in Table 2 and Table 3.

By comparing Example 5-19, 5-20, and 5-2, certain inorganic additives were demonstrated as improving tensile strength and/or ion transference numbers. The inorganic additive may provide certain advantages where the urea and/or carbamate are present. For instance, in Example 5, the test structures all use carbamate. The relatively higher

TABLE 3

| Example | Lithium Salt | Plasticizer | Inorganic Additives | Molar Ratio of Polymer: Plasticizer: Lithium Salt | Tensile Strength (MPa) | Decomposition Potential (V) | Ion Transfer Number |
|---|---|---|---|---|---|---|---|
| Example 5-19 | LiTFSI | SN | Al$_2$O$_3$ (5% wt) | 1:3:1 | 38.4 | >4.6 | 0.64 |
| Example 5-20 | | | Al$_2$O$_3$ (10% wt) | | 37.3 | | 0.71 |
| Example 5-21 | | | N/A | | 36.1 | | 0.42 |
| Example 5-22 | | | BaTiO$_3$ (5% wt) | | 39.2 | | 0.77 |

Cycling performance: The polymer solid electrolyte was assembled in a 2032-coin cell with graphite as anode, and NMC811 as cathode. The cycling test was performed with a Neware cycling tester. All the batteries were tested using the same charging and discharging rate. The charge/discharge voltage window was from 2.8 V to 4.2 V. The battery was cycled at a current rate of 0.1 C from the first cycle to the fifth cycle, then the battery was cycled at a current rate of 0.33 C from the sixth cycle to the tenth cycle, then the battery was cycled at a current rate of 0.5 C from the eleventh cycle to the fifteenth cycle, then the battery was cycled at a current rate of 0.33 C from the sixteenth cycle.

Figure 8:
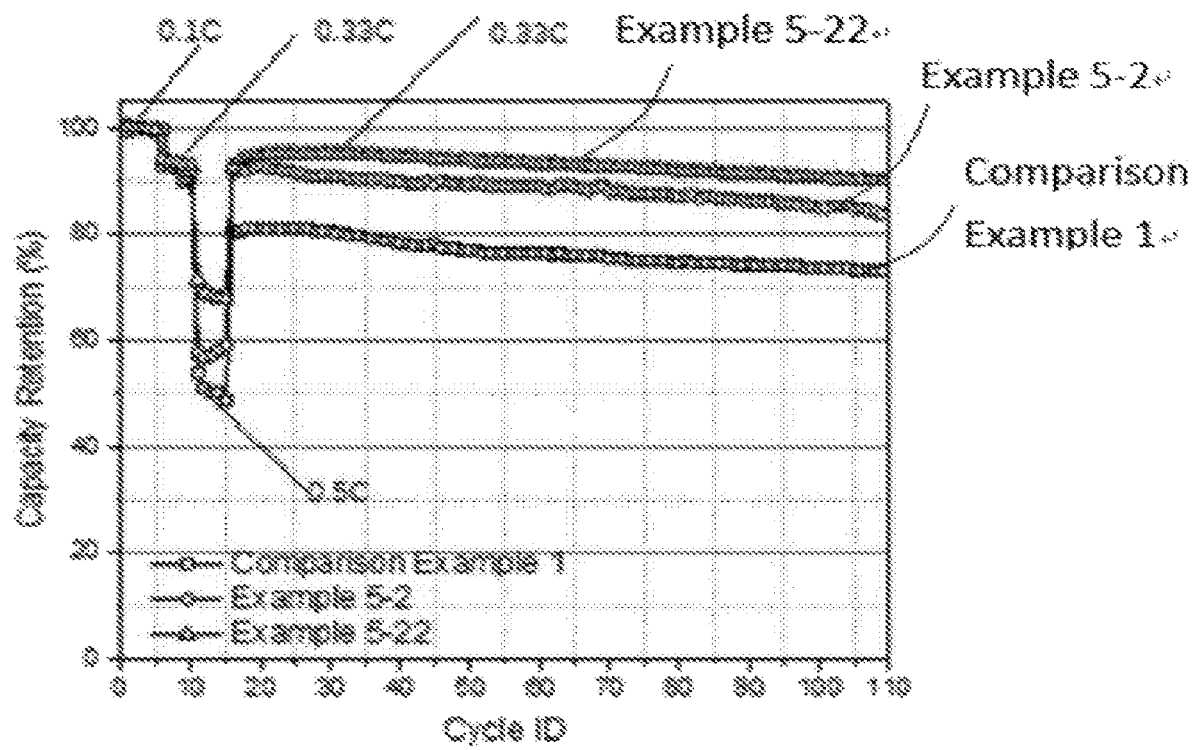
FIG. 8 is illustrates capacity retention curves, in one embodiment.

FIG. 8 illustrates the capacity retention curves of Example 5-2, Example 5-22, and Comparison Example 1 at current rates of 0.1 C, 0.33 C, 0.5 C, 0.33 C at room temperature.

From FIG. 8, from the first cycle to the tenth cycle, Comparison Example 1, Example 5-2, and Example 5-22 showed similar capacity retentions at >98% of a standard discharge capacity of 175 mAh/g at 0.1 C and 0.33 C current rates. Comparison Example 1 and Example 5-2 showed a capacity retention of below 60% at a current rate of 0.5 C. Example 5-22 showed a capacity retention of 70% at a current rate of 0.5 C. Thus, the formulation of Example 5-22 kept a 0.5 C rate capacity retention of 70% of its 0.1 C rate capacity retention. In contrast, Comparison Example 1 and Example 5-2 had capacity retentions both below 60%, and the rate performance was improved by adding $BaTO_3$ as additive.

Comparing the capacity retention after cycling at 0.5 C (the capacity retention at a current rate of 0.33 C after the sixteenth cycle) and the capacity retention before cycling at 0.5 C (the capacity retention at a current rate of 0.33 C from the sixth cycle to the tenth cycle), Comparison Example 1 showed reduced capacity retention after cycling at 0.5 C, while Example 5-2 and Example 5-22 offered similar capacity retention, before and after cycling at 0.5 C. The cycling capacity retention of Example 5-2 and 5-22 was better than Comparison Example 1. Thus, the cycle performance of the polymer solid electrolyte was improved in this example.

In addition, in comparison with Example 5-2, Example 5-22 offered a higher and more stable capacity retention. Cycle performance was improved by adding $BaTO_3$ as an additive.

Figure 9:
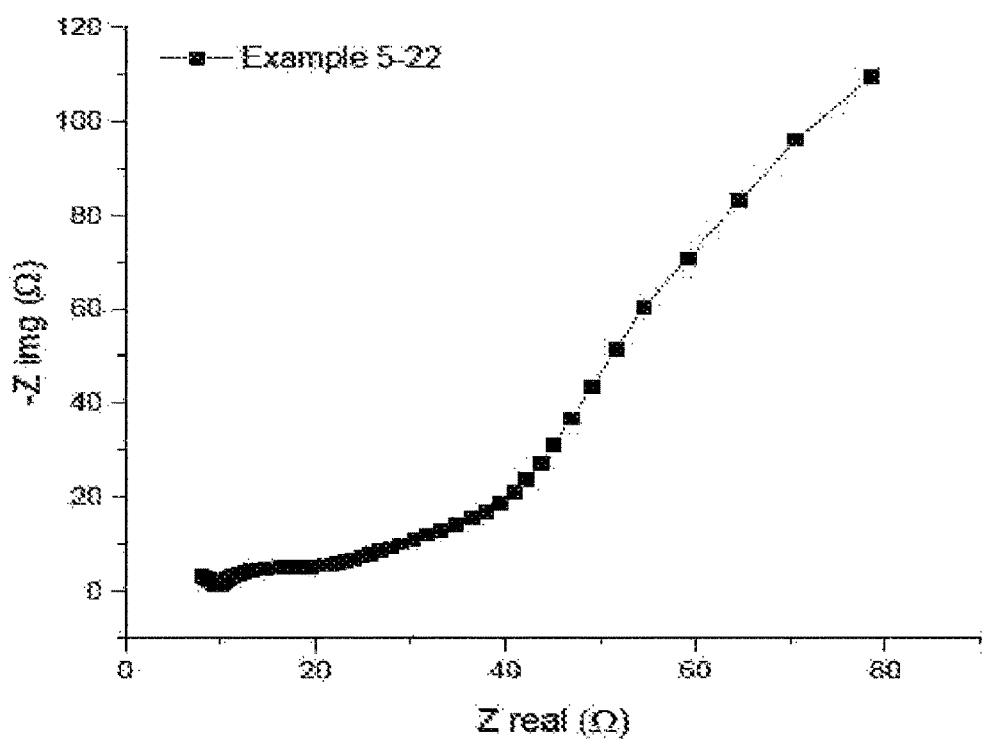
FIG. 9 illustrates an ionic conductivity curve, in another embodiment.

FIG. 9 illustrates an ionic conductivity curve of the polymer solid electrolyte of Example 5-22

The ionic conductivity of the electrolyte in Example 5-22 was $0.95 \times 10^{-3}$ S/cm. The inorganic additive $BaTiO_3$ increased the tensile strength to 39.2 mPa, as can be seen by comparing these examples to Examples 5-19 to 5-21. In addition, the ion transfer number also improved to 0.77.

The ion transfer number was measured using a Gamry 1010B or Gamry 1010E instrument with a DC polarization of 10 mV, and an EIS spectrum in the range of 100 kHz to 1 Hz. The testing method was based on Peter G. Bruce, James Evants, and Colin A. Vincent, "Conductivity and transference number measurements on polymer electrolytes," *Solid State Ionics*, 28-30 (1988) 918-922.

Example 6

This example illustrates the synthesis of polyethylene glycol-bis-urea, Polymer G (see FIG. 3):

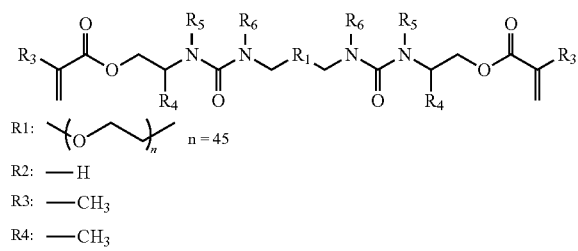

R1: (structure shown), n = 45
R2: —H
R3: —CH$_3$
R4: —CH$_3$

In this example, a round bottom flask was filled with poly(ethylene glycol) diamine (40 mmol, Mn=2000, PEG2000DAm), 3-methyl-2-oxazolidinone (85 mmol), and chloroform (100 ml). The mixture was stirred for 24 hours at 20° C. The resultant reaction mixture solution was washed with water (100 ml). The water fraction was separated and re-extracted by two portions of chloroform (100 ml). All of the organic phases were combined and dried with magnesium sulfate. The dried organic solution was filtered and concentrated using a rotary evaporator. A crude mixture of polyethylene glycol-bis-urea (PEGBU2000) was obtained as a yellow solid. The crude product was further purified by silica column chromatography.

The PEGBU2000 (10 mmol) obtained from last step was mixed with methacrylic anhydride (25 mmol) in a beaker in an ice cold bath. 4-dimethylaminopyridine (0.1%, DMAP) was used as a catalyst, with hydroquinone (0.1%, HQr) as an inhibitor, and triethylamine (50 mmol, TEA) was. The reaction was carried out for 24 hours. The crude reaction mixture was neutralized and washed with 0.5 M aqueous sodium bicarbonate solution. Then, the aqueous phase was washed twice with chloroform. All of the organic phases were combined and dried with magnesium sulfate. The dried organic solution was filtered and concentrated using a rotary evaporator. A crude mixture of polyethylene glycol-bis-urea dimethacrylate (PEGBU2000DA) was obtained as a yellow solid. The crude product was further purified by silica column chromatography with an eluent of mixed solvent of chloroform and n-hexane in a volume ratio of between 1:4 and 3:2.

A solid-state polymer electrolyte was obtained by mixing the as-synthesized polymer, lithium salts, and plasticizer in the amounts and ratios described in Table 4 by mechanical stirring at room temperature in the liquid state.

The liquid and viscous mixture mentioned above was directly applied onto a polyethylene terephthalate (PET) substrate. A 5-minute UV exposure was applied to the coating. Mechanical properties (e.g., tensile strength and tensile elongation), ionic conductivities, and electrochemical stability were determined. The measurement methods and conditions were similar to Example 1. The results are listed in Table 4.

Example 7

This example illustrates the synthesis of polypropylene glycol-bis-carbamate, Polymer E (see FIG. 3):

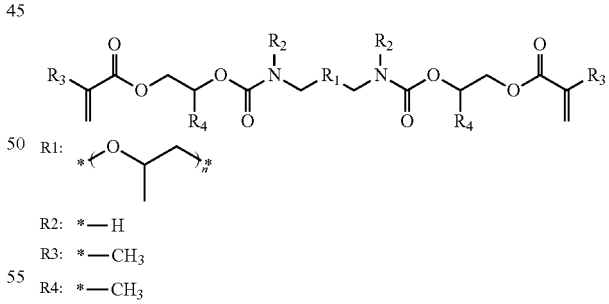

R1: (structure shown)
R2: *—H
R3: *—CH$_3$
R4: *—CH$_3$

In this structure, n is 45. In this example, a round bottom flask was filled with poly(propylene glycol) diamine (40 mmol, Mn=2000, PPG2000DAm), propylene carbonate (85 mmol), and chloroform (100 ml). The mixture was stirred for 24 hours at 20° C. The resultant reaction mixture solution was washed with water (100 ml). The water fraction was separated and re-extracted by two portions of chloroform (100 ml). All of the organic phases were combined and dried with magnesium sulfate. The dried organic solution was filtered and concentrated using a rotary evaporator. A crude mixture of polypropylene glycol-bis-carbamate (PPGBC2000) was obtained as a brown solid. The crude product was further purified by silica column chromatography.

The PPGBC2000 (10 mmol) obtained from last step was mixed with methacrylic anhydride (25 mmol) in a beaker in an ice cold bath. 4-dimethylaminopyridine (0.1%, DMAP) was used as a catalyst, with hydroquinone (0.1%, HQr) as an inhibitor, and triethylamine (50 mmol, TEA). The reaction was carried out for 24 hours. The crude reaction mixture was neutralized and washed with 0.5 M aqueous sodium bicarbonate solution. Then, the aqueous phase was washed twice with chloroform. All of the organic phases were combined and dried with magnesium sulfate. The dried organic solution was filtered and concentrated using a rotary evaporator. A crude mixture of polypropylene glycol-bis-carbamate dimethacrylate (PPGBC2000DA) was obtained as a yellow solid. The crude product was further purified by silica column chromatography with an eluent of mixed solvent of chloroform and n-hexane in a volume ratio of between 1:4 and 3:2.

A solid-state polymer electrolyte was obtained by mixing the as-synthesized polymer, lithium salts, and plasticizer in the amounts and ratios described in Table 4 by mechanical stirring at room temperature in the liquid state.

The liquid and viscous mixture mentioned above was directly applied onto a polyethylene terephthalate (PET) substrate. A 5-minute UV exposure was applied to the coating. Mechanical properties (e.g., tensile strength and tensile elongation), ionic conductivities, and electrochemical stability were determined. The measurement methods and conditions were similar to Example 1. The results are listed in Table 4.

Example 8

This example illustrates the synthesis of polyphenylene-bis-carbamate, Polymer F (see FIG. 3):

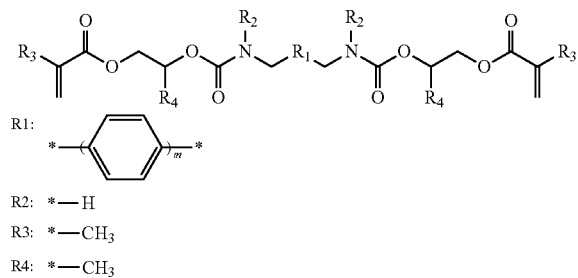

R2: *—H
R3: *—CH$_3$
R4: *—CH$_3$

In this structure, m is 45. In this example, a round bottom flask was filled with 1,4-phenylenediamine (40 mmol, Mn=2000, PDAm), propylene carbonate (85 mmol), and chloroform (100 ml). The mixture was stirred for 24 hours at 20° C. The resultant reaction mixture solution was washed with water (100 ml). The water fraction was separated and re-extracted by two portions of chloroform (100 ml). All of the organic phases were combined and dried with magnesium sulfate. The dried organic solution was filtered and concentrated using a rotary evaporator. A crude mixture of polyphenylene-bis-carbamate (PPBC2000) was obtained a brown solid. The crude product was further purified by silica column chromatography.

The PPBC2000 (10 mmol) obtained from the last step was mixed with methacrylic anhydride (25 mmol) in a beaker in an ice cold bath. 4-dimethylaminopyridine (0.1%, DMAP) was used as a catalyst, with hydroquinone (0.1%, HQr) as an inhibitor, and triethylamine (50 mmol, TEA). The reaction was carried out for 24 hours. The crude reaction mixture was neutralized and washed with 0.5 M aqueous sodium bicarbonate solution. Then, the aqueous phase was washed twice with chloroform. All the organic phases were combined and dried with magnesium sulfate. The dried organic solution was filtered and concentrated using a rotary evaporator. A crude mixture of polyphenylene-bis-carbamate dimethacrylate (PPBC2000DA) was obtained as a yellow solid. The crude product was further purified by silica column chromatography with an eluent of mixed solvent of chloroform and n-hexane in a volume ratio of between 1:4 and 3:2.

A solid-state polymer electrolyte was obtained by mixing the as-synthesized polymer, lithium salts, and plasticizer in the amounts and ratios described in Table 4 by mechanical stirring at room temperature in the liquid state.

The liquid and viscous mixture mentioned above was directly applied onto a polyethylene terephthalate (PET) substrate. A 5-minute UV exposure was applied to the coating. Mechanical properties (e.g., tensile strength and tensile elongation), ionic conductivities, and electrochemical stability were determined. The measurement methods and conditions were similar to Example 1. The results are listed in Table 4.

Comparison Example 3

This example illustrates the synthesis of polyethylene glycol dimethacrylate, Polymer D:

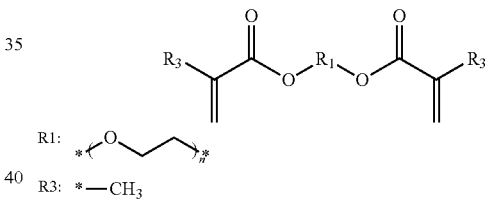

R1: *—(O—)$_n$—*

R3: *—CH$_3$

In this structure, n is 16. This polymer can be readily obtained commercially. In this example, the polyethylene glycol (10 mmol, Mn=700, PEG700) was mixed with methacrylic anhydride (25 mmol) in a beaker in an ice cold bath. 4-dimethylaminopyridine (0.1%, DMAP) was used as a catalyst, with hydroquinone (0.1%, HQr) as an inhibitor, and triethylamine (50 mmol, TEA). The reaction was carried out for 24 hours. The crude reaction mixture was neutralized and washed with 0.5 M aqueous sodium bicarbonate solution. Then the aqueous phase was washed twice with chloroform. All of the organic phases were combined and dried with magnesium sulfate. The dried organic solution was filtered and concentrated using a rotary evaporator. A crude mixture of polyethylene glycol dimethacrylate (PEGDA700) was obtained a yellow solid. The crude product was further purified by silica column chromatography with an eluent of mixed solvent of chloroform and n-hexane in a volume ratio of between 1:4 and 3:2.

A solid-state polymer electrolyte was obtained by mixing the as-synthesized polymer, lithium salts, and plasticizer in the amounts and ratios described in Table 4 by mechanical stirring at room temperature in the liquid state.

The liquid and viscous mixture mentioned above was directly applied onto a polyethylene terephthalate (PET) substrate. A 5-minute UV exposure was applied to the coating. Mechanical properties (e.g., tensile strength and tensile elongation), ionic conductivities, and electrochemical stability were determined. The measurement methods and conditions are similar to Example 1. The results are listed in Table 4, and a graph of stress versus strain of this polymer versus the one in Example 5 is shown in FIG. 1. These were characterized using procedures similar to those disclosed above in Example 1. The data were collected under similar methods and conditions.

Example Summary

Table 4 shows a comparison data set of Examples 5 through 8 using the same measuring methods and conditions.

TABLE 4

| Example/Comparison | Lithium salt | Plasticizer | Molar ratio of polymer:plasticizer:lithium salt | Tensile strength (MPa) | Elongation at break (%) | Ionic Conductivity (S/cm) | Decomposition Voltage (V) |
|---|---|---|---|---|---|---|---|
| Example 5 | LiTFSI | SN | 1:3:1 | 19.2 | | $5.2 \times 10^{-3}$ | >4.6 |
| Example 6 | | | | 36.1 | | $1.7 \times 10^{-4}$ | >4.6 |
| Example 7 | | | | 22.5 | | $3.1 \times 10^{-4}$ | >4.6 |
| Example 8 | | | | 34.2 | | $4.0 \times 10^{-4}$ | >4.6 |
| Comparison Example 3 | | | | 8.2 | | $1.3 \times 10^{-4}$ | 3.9 |

Compared with Comparative Example 3, the polymer in Example 6 having a urea functional group exhibited increased tensile strength and elongation at break. The ionic conductivity was also improved. In addition, the urea functional group lead to a more stable material with a higher decomposition potential.

Compared with Comparative Example 3, the polymer in Examples 5, 7, and 8 having a carbamate functional group exhibited increased tensile strength and elongation at break. The ionic conductivity was also improved. In addition, the carbamate functional group lead to a more stable material with higher decomposition potential.

Figure 4:
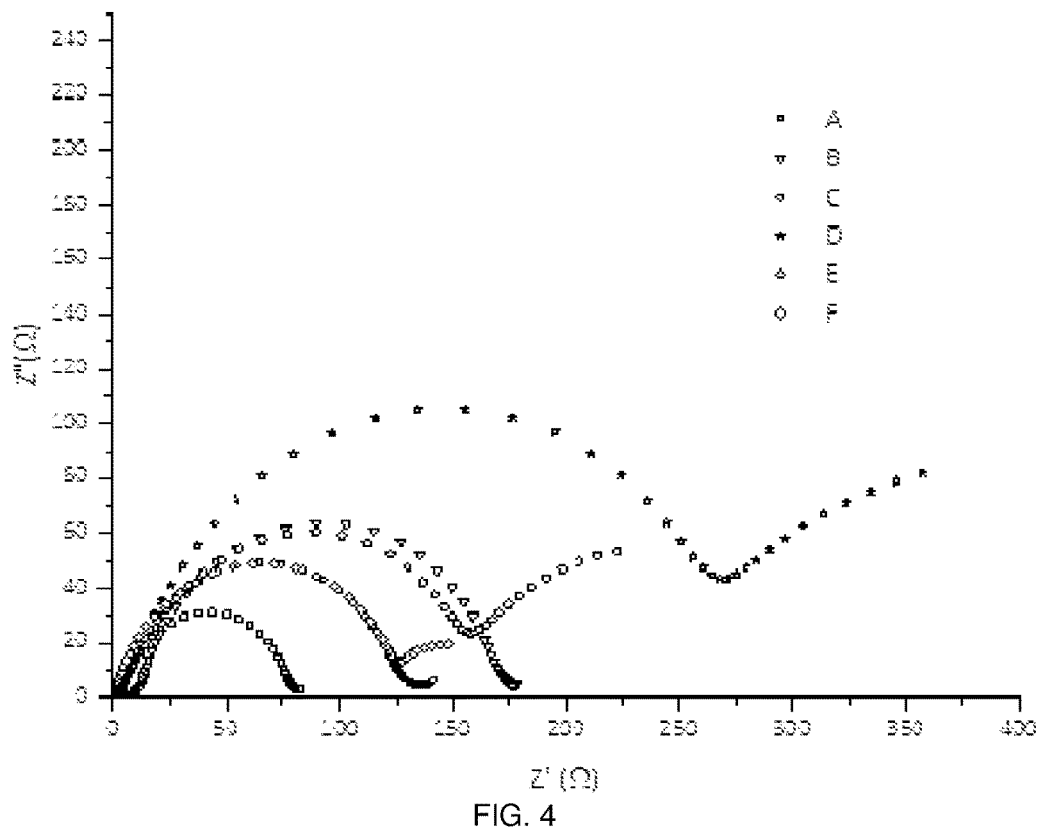
FIG. 4 illustrates ionic conductivity curves of the polymer solid electrolyte of certain embodiments of the invention.

FIG. 4 illustrates electrochemical impedance spectroscopy of solid state electrolyte fabricated by the polymers in Examples 3, 4, 7, and 8, and Comparison Examples 1 and 3. The formulation is shown in Table 1, 2 and 3. The far left cross between the semi-cycle and the line Y=0 disclose the bulk resistance of the solid state electrolyte membrane. The ionic conductivity can be calculated with the known thickness and area the membrane.

In summary, the incorporation of urea and/or carbamate functional groups with UV crosslinked solidification appeared to considerably improve various mechanical properties and electrochemical performances. These polymer solid electrolytes may help to achieve safe, long life lithium secondary batteries. The polymer solid electrolytes in these experiments exhibited better ionic conductivity than the comparative materials, and the lithium ion was conducted faster and more efficiently. These properties may benefit the charging/discharging rate performances of lithium ion batteries. The improved decomposition potential of the polymer materials can also provide enhanced stability in solid state electrolytes, which may provide longer life and/or higher voltage lithium batteries. In addition, the polymer solid electrolytes in these examples did not use any organic solvents. Thus, they may reliably provide safe performance of lithium ion batteries, as well as other applications.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When the word "about" is used herein in reference to a number, it should be understood that still another embodiment of the invention includes that number not modified by the presence of the word "about."

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An electrochemical cell with an electrolyte comprising a crosslinked polymer obtained by a crosslinking reaction including one or more monomers selected from the group consisting of:

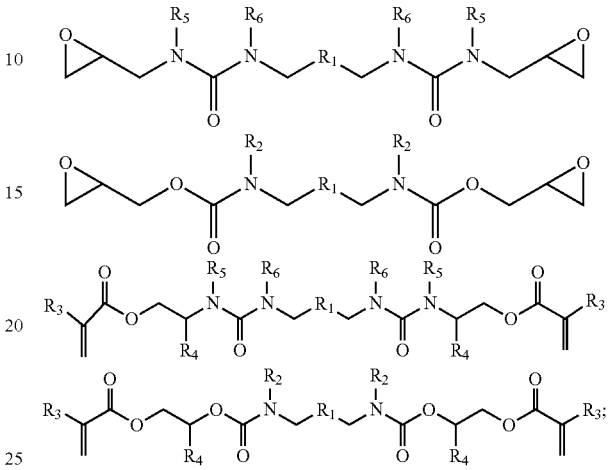

wherein $R_1$ comprises a structure selected from the group consisting of:

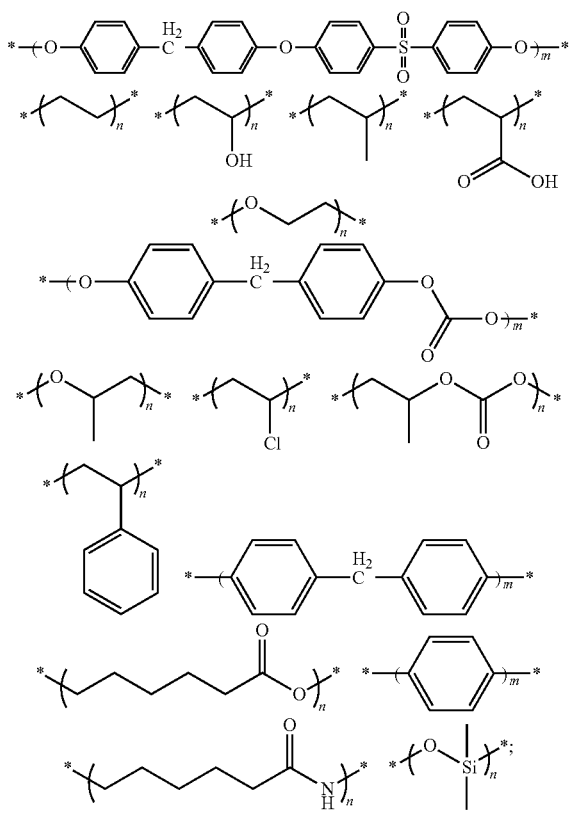

wherein n is an integer between 1 and 10,000, inclusively; m is an integer between 1 and 5,000, inclusively; $R_2$, $R_3$, $R_4$, $R_5$, and $R_6$ are each independently selected from the group consisting of hydrogen, methyl, ethyl, phenyl, benzyl, acryl, epoxy ethyl, isocyanate, cyclic carbonate, lactone, lactam, and vinyl; and * indicates a point of attachment.

2. The electrochemical cell of claim 1, wherein the one or more monomers are crosslinked in the presence of an initiator or crosslinking agent, at an elevated temperature, under UV light, or a combination thereof.

3. The electrochemical cell of claim 2, wherein the initiator or crosslinking agent has a mole fraction ranging from 0.001 and 0.01.

4. The electrochemical cell of claim 1, wherein the electrolyte comprises a plasticizer and an electrolyte salt.

5. The electrochemical cell of claim 4, wherein the one or more monomers have a mole fraction ranging from 0.027 to 0.200 in the electrolyte prior to the crosslinking, the plasticizer has a mole fraction ranging from 0.287 to 0.916, and the electrolyte salt has a mole fraction ranging from 0.04 to 0.617.

6. The electrochemical cell of claim 4, wherein the plasticizer comprises ethylene carbonate, cyclic carbonate, oligoether, succinonitrile, polyethylene oxide, polycarbonate, polyacrylonitrile, polyactic acid, ionic liquid, nitrile or a combination thereof.

7. The electrochemical cell of claim 4, wherein the electrolyte salt comprises a lithium salt, a quaternary ammonium salt, a quaternary phosphonium salt, a transition metal salt, or a salt of protonic acid.

8. The electrochemical cell of claim 4, wherein the electrolyte is a solid polymer electrolyte and has a tensile strength of between 5 and 500 MPa.

9. The electrochemical cell of claim 4, wherein the electrolyte has an ionic conductivity of between $1.0 \times 10^{-8}$ and $1.0 \times 10^{-2}$ S/cm and a decomposition voltage of at least 3.8 V.

10. The electrochemical cell of claim 1, wherein the electrochemical cell is a battery, a lithium-ion battery or a solid state battery.

11. The electrochemical cell of claim 4, wherein the one or more monomers are crosslinked after mixing with the electrolyte salt and the plasticizer.

12. The electrochemical cell of claim 1, wherein the electrolyte further comprises an inorganic additive.

13. The electrochemical cell of claim 12, wherein the inorganic additive is selected from the group consisting of $Al_2O_3$, $SiO_2$, $SiO_x$, $TiO_2$, $Li_3PS_4$, $Li_{10}GeP_2S_{12}$, $Li_7La_3Zr_2O_{12}$, $Li_{6.4}La_3Zr_{1.4}Ta_{0.6}O_{12}$, $LiLaTiO_3$, $Li_{1.3}Al_{0.3}Ti_{1.7}(PO_4)_3$, $Li_{1.3}Al_{0.3}Ge_{1.7}(PO_4)_3$, $ZrO_2$, $BaTiO_3$ and $Li_2TiO_3$.

14. The electrochemical cell of claim 1, wherein the crosslinked polymer is formed via urea and/or carbamate functional groups.

15. An electrochemical cell with an electrolyte comprising a crosslinked copolymer obtained by a crosslinking reaction including a first monomer selected from the group consisting of:

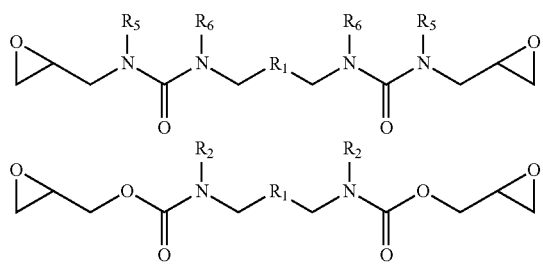

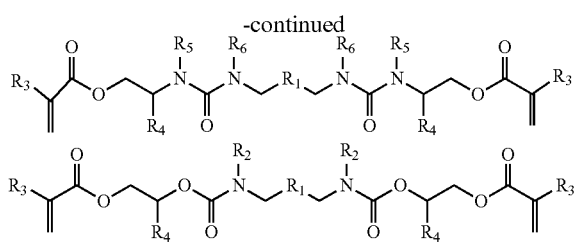

and a second monomer selected from the group consisting of methacrylate, norbornyl methacrylate, methyl methacrylate, ethyl methacrylate, butyl methacrylate, 2-aminoethyl methacrylate hydrochloride, glycidyl methacrylate, 2-(diethylamino)ethyl methacrylate, wherein $R_1$ comprises a structure selected from the group consisting of:

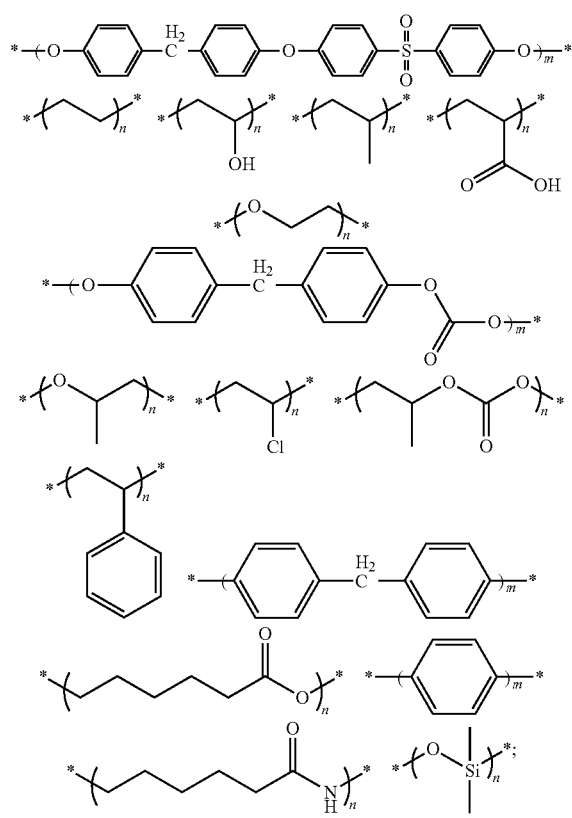

wherein n is an integer between 1 and 10,000, inclusively; m is an integer between 1 and 5,000, inclusively; $R_2$, $R_3$, $R_4$, $R_5$, and $R_6$ are each independently selected from the group consisting of hydrogen, methyl, ethyl, phenyl, benzyl, acryl, epoxy ethyl, isocyanate, cyclic carbonate, lactone, lactam, and vinyl; and * indicates a point of attachment.

16. A method of making a solid electrolyte comprising a crosslinked polymer, comprising:
  a) mixing a composition comprising one or more monomers, an electrolyte salt and a plasticizer to form a slurry; and
  b) curing the one or more monomers in the slurry into a crosslinked polymer, leading to a solid electrolyte comprising the crosslinked polymer with the electrolyte salt and plasticizer therein, wherein the one or more monomers are selected from the group consisting of:

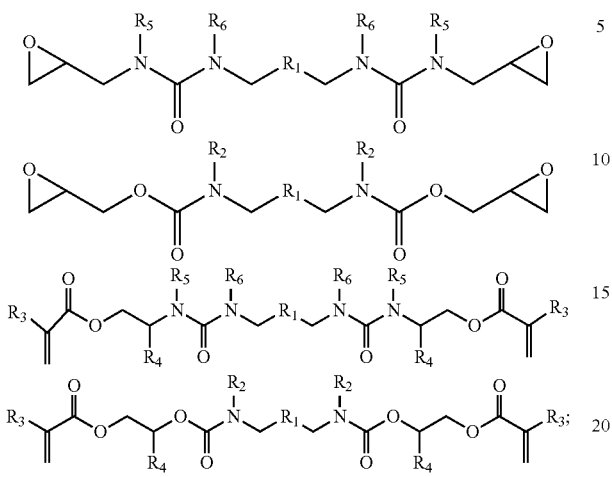

wherein $R_1$ comprises a structure selected from the group consisting of:

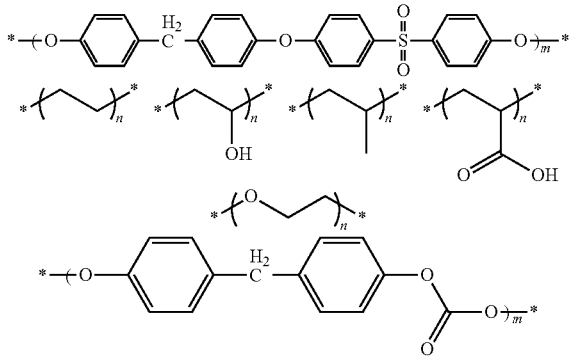

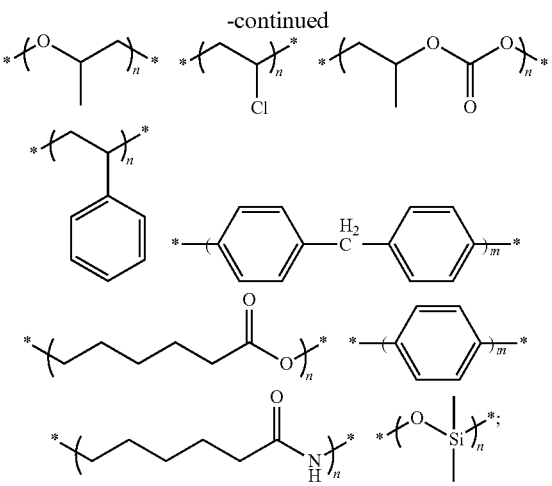

wherein n is an integer between 1 and 10,000, inclusively; m is an integer between 1 and 5,000, inclusively; $R_2$, $R_3$, $R_4$, $R_5$, and $R_6$ are each independently selected from the group consisting of hydrogen, methyl, ethyl, phenyl, benzyl, acryl, epoxy ethyl, isocyanate, cyclic carbonate, lactone, lactam, and vinyl; and * indicates a point of attachment.

17. The method of claim 16, wherein the slurry is cured in the presence of an initiator or crosslinking agent, under UV, or in the presence of an initiator or crosslinking agent under UV.

18. The method of claim 16, wherein the slurry is cured at a temperature between 20° C. and 100° C.

19. The method of claim 16, further comprising, forming a film of the slurry prior to curing the slurry.

20. The method of claim 16, wherein the composition comprises a solvent and the solvent is removed after formation of the slurry.

* * * * *